US011303389B2

(12) United States Patent
Amicangioli et al.

(10) Patent No.: US 11,303,389 B2
(45) Date of Patent: Apr. 12, 2022

(54) SYSTEMS AND METHODS OF LOW LATENCY DATA COMMUNICATION FOR PHYSICAL LINK LAYER RELIABILITY

(71) Applicant: Hyannis Port Research, Inc., Needham, MA (US)

(72) Inventors: Anthony D. Amicangioli, Newton, MA (US); B. Joshua Rosen, Westford, MA (US)

(73) Assignee: Hyannis Port Research, Inc., Needham, MA (US)

( * ) Notice: Subject to any disclaimer, the term of this patent is extended or adjusted under 35 U.S.C. 154(b) by 42 days.

(21) Appl. No.: 16/988,043

(22) Filed: Aug. 7, 2020

(65) Prior Publication Data
US 2022/0045790 A1 Feb. 10, 2022

(51) Int. Cl.
*H04L 1/00* (2006.01)
*H04L 1/18* (2006.01)
(52) U.S. Cl.
CPC .......... *H04L 1/0083* (2013.01); *H04L 1/0041* (2013.01); *H04L 1/1816* (2013.01); *H04L 1/1858* (2013.01)
(58) Field of Classification Search
CPC .............. H04L 1/0041; H04L 1/0086; H04L 1/1816; H04L 1/1858
See application file for complete search history.

(56) References Cited

U.S. PATENT DOCUMENTS

| 6,697,331 B1 | 2/2004 | Riihinen et al. |
| 7,023,833 B1 | 4/2006 | Aiello et al. |
| 7,496,086 B2 | 2/2009 | Eckberg |

(Continued)

FOREIGN PATENT DOCUMENTS

| EP | 1427146 A1 | 6/2004 |
| JP | 2019050013 A | 3/2019 |

(Continued)

OTHER PUBLICATIONS

Determinism is the new latency, Arista.com, Solution Brief, 3 pages, Jan. 23, 2019.

(Continued)

*Primary Examiner* — Shelly A Chase
(74) *Attorney, Agent, or Firm* — Gesmer Updegrove LLP

(57) ABSTRACT

Systems and methods are disclosed herein that provide low latency data communication with improved physical link layer reliability through repeated physical layer retransmission of data over a data connection whenever the connection is idle (i.e., no new data to send). In some embodiments, the transmission of administrative control symbols (e.g., "idles," "commas", etc.) can be suppressed or otherwise reduced to allow some of the available connection bandwidth to be used for data redundancy and fault tolerance through the repeated retransmission of data as described in more detail below. Accordingly, instead of executing time-consuming, error correcting routines, a receive node can discard the erroneous data frame and process at least one repeat frame that carries the same data payload. Sequence numbers and/or other repeat indicators can be used to distinguish original frames from repeat frames and/or for identifying which frames carry the same data payload.

37 Claims, 15 Drawing Sheets

(56) References Cited

U.S. PATENT DOCUMENTS

| | | | |
|---|---|---|---|
| 7,720,043 B2 | 5/2010 | Meylan et al. |
| 7,876,740 B2 | 1/2011 | Eastwood et al. |
| 7,876,751 B2 | 1/2011 | Benner et al. |
| 7,885,296 B2 | 2/2011 | Biederman et al. |
| 8,923,341 B2 | 12/2014 | Barnette et al. |
| 9,691,102 B2 | 6/2017 | Studnitzer et al. |
| 9,712,606 B2 | 7/2017 | Farnlof et al. |
| 9,929,743 B1 | 3/2018 | Acuna-Rohter et al. |
| 10,104,148 B2 | 10/2018 | Yang et al. |
| 10,262,365 B2 | 4/2019 | Venkataraman |
| 10,417,709 B2 | 9/2019 | Hosman et al. |
| 10,467,693 B2 | 11/2019 | Studnitzer et al. |
| 10,585,729 B2 | 3/2020 | Vaccaro et al. |
| 10,637,967 B2 | 4/2020 | Bonig et al. |
| 10,699,336 B2 | 6/2020 | Burkhardt et al. |
| 2003/0065974 A1 | 4/2003 | Lam et al. |
| 2003/0235209 A1 | 12/2003 | Garg et al. |
| 2004/0027999 A1 | 2/2004 | Casaccia et al. |
| 2004/0246897 A1 | 12/2004 | Ma et al. |
| 2007/0255855 A1 | 11/2007 | Knapp et al. |
| 2008/0069118 A1 | 3/2008 | Monier |
| 2008/0084833 A1 | 4/2008 | Picard |
| 2010/0046368 A1 | 2/2010 | Kaempfer et al. |
| 2010/0318673 A1 | 12/2010 | Kemp, II et al. |
| 2011/0194409 A1 | 8/2011 | Ofelt et al. |
| 2011/0264577 A1 | 10/2011 | Winbom et al. |
| 2012/0044940 A1 | 2/2012 | Katz et al. |
| 2012/0093022 A1 | 4/2012 | Wang |
| 2012/0131221 A1 | 5/2012 | Foygel et al. |
| 2012/0195203 A1 | 8/2012 | Godbole et al. |
| 2012/0317011 A1 | 12/2012 | Duuquette |
| 2015/0081508 A1* | 3/2015 | Schwall ............. G06Q 40/04 705/37 |
| 2015/0341422 A1 | 11/2015 | Färnlöf et al. |
| 2015/0356679 A1 | 12/2015 | Schmitt |
| 2016/0119080 A1* | 4/2016 | Gineste ............. H04L 1/0041 714/776 |
| 2016/0294921 A1 | 10/2016 | Meng et al. |
| 2017/0127341 A1 | 5/2017 | Di Marco et al. |
| 2017/0236203 A1 | 8/2017 | Amicangioli |
| 2018/0083737 A1 | 3/2018 | Mendes da Silva et al. |
| 2018/0167492 A1 | 6/2018 | Bonig et al. |
| 2018/0279934 A1 | 10/2018 | Wo et al. |
| 2018/0359195 A1 | 12/2018 | Shah et al. |
| 2019/0097745 A1 | 3/2019 | Mallela et al. |
| 2019/0222442 A1 | 7/2019 | Wei et al. |
| 2019/0259099 A1 | 8/2019 | Katsuyama et al. |
| 2019/0349309 A1 | 11/2019 | Bonig et al. |
| 2019/0379768 A1 | 12/2019 | Amicangioli et al. |
| 2020/0034929 A1 | 1/2020 | Rao et al. |
| 2020/0134720 A1 | 4/2020 | Katsuyama et al. |
| 2020/0167865 A1 | 5/2020 | Craig et al. |
| 2020/0169355 A1 | 5/2020 | McIlroy |
| 2020/0187274 A1 | 6/2020 | Rune et al. |

FOREIGN PATENT DOCUMENTS

| | | |
|---|---|---|
| WO | 2012144999 A2 | 10/2012 |
| WO | 2016020727 A1 | 2/2016 |
| WO | 2018106350 A1 | 6/2018 |

OTHER PUBLICATIONS

"ICON Deterministic Packet Transport," SEL Schweitzer Engineering Laboratories, 4 pages, 2016.

Geng et al., Requirements of Layer 3 Deterministic Latency Service draft-geng-detnet-requirements-bounded-latency-03, Retrieved from tools.ietf.org/html/draft-geng-detnet-requirements-bounded-latency-03 on Jul. 2019, 9 pages.

Qui et al., Hierarchy Virtual Queue Based Flow Control in LTE/SAE, 2010 Second International Conference on Future Networks, pp. 78-82, 2010.

Configuring Queuing and Flow Control, Cisco Nexus 5000 Series NX-OS Quality of Service Configuration Guide, Release 5.2(1)N1(1), Jan. 2018, 12 pages.

International Search Report and Written Opinion issued by the European Patent Office (as International Searching Authority) in related International Application No. PCT/US2021/044624 dated Nov. 16, 2021, 14 pages.

* cited by examiner

SYSTEMS AND METHODS OF LOW LATENCY DATA COMMUNICATION FOR PHYSICAL LINK LAYER RELIABILITY

TECHNICAL FIELD

Systems and methods described herein relate to reliable data communication in an electronic trading system and/or other distributed computing systems, and more particularly to systems and methods for low latency data communication with improved physical link layer reliability through repeated physical layer retransmission of data over a data connection.

BACKGROUND OF THE INVENTION

Conventional physical link layer protocols, such as 10 Gigabit Ethernet (10 GigE), 40 GigE, and faster, typically use Forward Error Correction (FEC) for reliable data communication. In particular, FEC recodes blocks of 66-bit data symbols into blocks of 65-bit data symbols, thereby saving one bit per symbol. The saved bits are used for an Error Correcting Code that can be used to detect and correct errors in a bit stream. Thus, FEC can significantly improve the reliability of data communication without decreasing the bandwidth of the data connection.

Although FEC can provide reliable, bandwidth efficient data communication, FEC typically adds significant delays or latency due to its complex processing overhead. Such inherent latency in FEC processing may limit its usefulness for certain types of data communication systems that are particularly latency sensitive, including without limitation electronic trading systems. For example, when a trade order communicated with an electronic trading system is delayed due to FEC processing, the price at which a trade is executed may be affected. Thus, in some applications, the use of FEC for physical link reliability can come at a significant cost. Although FEC can be disabled, the physical link layer reliability of the data communication system may degrade.

Accordingly, there is a need for low latency data communication systems having improved physical link layer reliability.

SUMMARY OF PREFERRED EMBODIMENTS

Some physical layer protocols, such as the Physical Coding Sublayer (PCS) used for Ethernet communication (e.g., 10/25/40/100 GigE), continually transmit control or other administrative packets even when a data connection is idle. For example, idle and comma symbol patterns are typically sent over Ethernet connections for receiver synchronization purposes whenever the data connection is idle. In some environments, such as electronic trading systems, the average bandwidth utilization for data communication over a data connection can be relatively low. Accordingly, in those environments, control symbols, such as idle and comma symbols, constitute most of the physical link traffic.

Systems and methods are disclosed herein that provide low latency data communication with improved physical link layer reliability through repeated physical layer retransmission of data over a data connection whenever the connection is idle (i.e., no new data to send). In some embodiments, the transmission of administrative control symbols (e.g., "idles," "commas", etc. can be suppressed or otherwise reduced to allow some of the available connection bandwidth to be used for data redundancy and fault tolerance through the repeated retransmission of data as described in more detail below. Accordingly, instead of executing time-consuming error correcting routines, a receive node can discard the erroneous data frame and process at least one repeat frame that carries the same data payload. As discussed in greater detail below, sequence numbers and/or other repeat indicators can be used to distinguish original frames from repeats frames and/or for identifying which frames carry the same data payload.

One example method of low latency data communication can include transmitting an original frame that encapsulates a data payload from a transmit node to a receive node. The method further includes transmitting one or more repeat frames that encapsulate the same data payload as the original frame from the transmit node without waiting for an acknowledgement of the original frame from the receive node. The original frame and at least one of the repeat frames each includes a repeat indicator for identifying the at least one of the repeat frames as encapsulating the same data payload as the original frame.

In some embodiments, transmission of a repeat frame can involve suppressing transmission of an idle pattern or other control data (e.g., idles, commas, etc.). In some embodiments, the original frame and the repeat frames can be Ethernet frames, InfiniBand frames, USB frames, PCI-e frames, or HDMI frames, for example. In some embodiments, the original frame and the one or more repeat frames can be transmitted over a data connection having an average bandwidth utilization equal to 10% or less.

In some embodiments, the repeat indicator can be included in any suitable portion of the original and repeat frames. For example, the repeat indicator can be included in a frame header of the original frame and at least one of the repeat frames, such as but not limited to a preamble portion or a portion of a node address (e.g., a least significant bit (LSB) portion of the node address). Alternatively or additionally, the repeat indicator can be included in a data payload portion of the original and repeat frames. For example, where the data payload is an Internet Protocol (IP) data packet, the repeat indicator can be included in an Internet Protocol Identification (IP_ID) field of the IP data packet.

In some embodiments, the repeat indicator can be a sequence number, a Boolean value, or a unique identifier, for example. Where the repeat indicator is a sequence number, the sequence number can be identical for the original frame and any repeat frame that encapsulates the same data payload. For example, in some embodiments, the example method can further include incrementing the sequence number for a new data payload and transmitting the new data payload in another original frame and one or more repeat frames, such that each frame includes the same sequence number incremented for the new data payload.

Where the repeat indicator is a sequence number, the sequence number can be incremented for each repeat frame that encapsulates the same data payload as the original frame. For example, in some embodiments, the method can further include setting the sequence number to an initial sequence number for the original frame, incrementing the sequence number for each repeat frame that encapsulates the same data payload as the original frame, and resetting the sequence number to the initial sequence number for another original frame that encapsulates a new data payload.

In any of the foregoing embodiments, the example method can further include interrupting transmission of any of the one or more repeat frames to transmit another original frame that encapsulates a new data payload. The example method can further include receiving the original frame that encapsulates the data payload at the receive node, discarding the original frame (e.g., in response to detecting an error in the frame or for another reason), identifying a repeat frame that encapsulates the same data payload as the original frame from among the one or more repeat frames received at the receive node, and extracting the data payload from the identified repeat frame. The repeat frame can be identified based on the repeat indicator of the repeat frame.

Example embodiments are also disclosed for a low latency data communication system that includes a transmit node having a processor that executes a transmit engine. The transmit engine can be executed to encapsulate a data payload in an original frame, transmit the original frame from the transmit node over a data connection, and further transmit one or more repeat frames that encapsulate the same data payload as the original frame. The original frame and at least one of the repeat frames include a repeat indicator for identifying the at least one of the repeat frames as encapsulating the same data payload as the original frame. In some embodiments, the transmit engine of the transmit node can include a media access control (MAC) component and a physical code sublayer (PCS) component.

In some embodiments, transmission of a repeat frame can involve suppressing transmission of an idle pattern or other control data (e.g., idles, commas, etc.). In some embodiments, the original frame and the repeat frames can be Ethernet frames, InfiniBand frames, USB frames, PCI-e frames, or HDMI frames, for example. In some embodiments, the original frame and the one or more repeat frames can be transmitted over a data connection having an average bandwidth utilization equal to 1% or less.

In some embodiments, the repeat indicator can be included in any suitable portion of the original and repeat frames. For example, the repeat indicator can be included in a frame header of the original frame and the at least one of the repeat frames, such as but not limited to a preamble portion or a portion of a node address (e.g., a least significant bit (LSB) portion of the node address). Alternatively or additionally, the repeat indicator can be included in a data payload portion of the original and repeat frames. For example, where the data payload is an Internet Protocol (IP) data packet, the repeat indicator can be included in an Internet Protocol Identification (IP_ID) field of the IP data packet.

In some embodiments, the repeat indicator can be a sequence number, a Boolean value, or a unique identifier, for example. Where the repeat indicator is a sequence number, the sequence number can be identical for the original frame and any repeat frame that encapsulates the same data payload. For example, in some embodiments, the transmit engine can increment the sequence number for a new data payload and transmit the new data payload in another original frame and one or more repeat frames, such that each frame includes the same sequence number incremented for the new data payload.

Where the repeat indicator is a sequence number, the sequence number can be incremented for each repeat frame that encapsulates the same data payload as the original frame. For example, in some embodiments, the transmit engine can set the sequence number to an initial sequence number for the original frame, increment the sequence number for each repeat frame that encapsulates the same data payload as the original frame; and reset the sequence number to the initial sequence number for another original frame that encapsulates a new data payload. In any of the foregoing embodiments, the transmit engine can interrupt or abort transmission of any of the one or more repeat frames to transmit another original frame that encapsulates a new data payload.

In some embodiments, the data communication system can further include a receive node having a processor that executes a receive engine. The receive engine can be executed to receive the original frame that encapsulates the data payload, discard the original frame (e.g., in response to detecting an error in the frame or for another reason), identify a repeat frame that encapsulates the same data payload as the original frame from among the one or more repeat frames received at the receive node, and extract the data payload from the identified repeat frame. The repeat frame is identified based on the repeat indicator of the repeat frame. In some embodiments, the receive engine of the receive node can include a physical code sublayer (PCS) component and a media access control (MAC) component.

Example embodiments are also disclosed for an electronic trading system that provides low latency data communication. The example electronic trading system includes a transmit node having a processor that executes a transmit engine. The transmit engine can be executed to encapsulate a market order (e.g., buy order, sell order, among others) in an original frame, transmit the original frame from the transmit node over a network, and further transmit one or more repeat frames that encapsulate the same market order as the original frame. The original frame and at least one of the repeat frames include a repeat indicator for identifying the at least one of the repeat frames as encapsulating the same market order as the original frame.

In some embodiments, the data communication system can further include a receive node having a processor that executes a receive engine. The receive engine can be executed to receive the original frame that encapsulates the market order, discard the original frame (e.g., in response to detecting an error in the frame or for another reason), identify a repeat frame that encapsulates the same market order as the original frame from among the one or more repeat frames received at the receive node, and extract the market order from the identified repeat frame. The repeat frame is identified based on the repeat indicator of the repeat frame.

In some embodiments, the transmit node and the receive node can be any of a gateway, a sequencer, or a core compute node of the electronic trading system.

BRIEF DESCRIPTION OF THE DRAWINGS

The foregoing will be apparent from the following more particular description of example embodiments, as illustrated in the accompanying drawings in which like reference charters refer to the same parts throughout the different views. The drawings are not necessarily to scale, emphasis instead being placed upon illustrating the various embodiments.

DETAILED DESCRIPTION OF PREFERRED EMBODIMENTS

Figure 1:
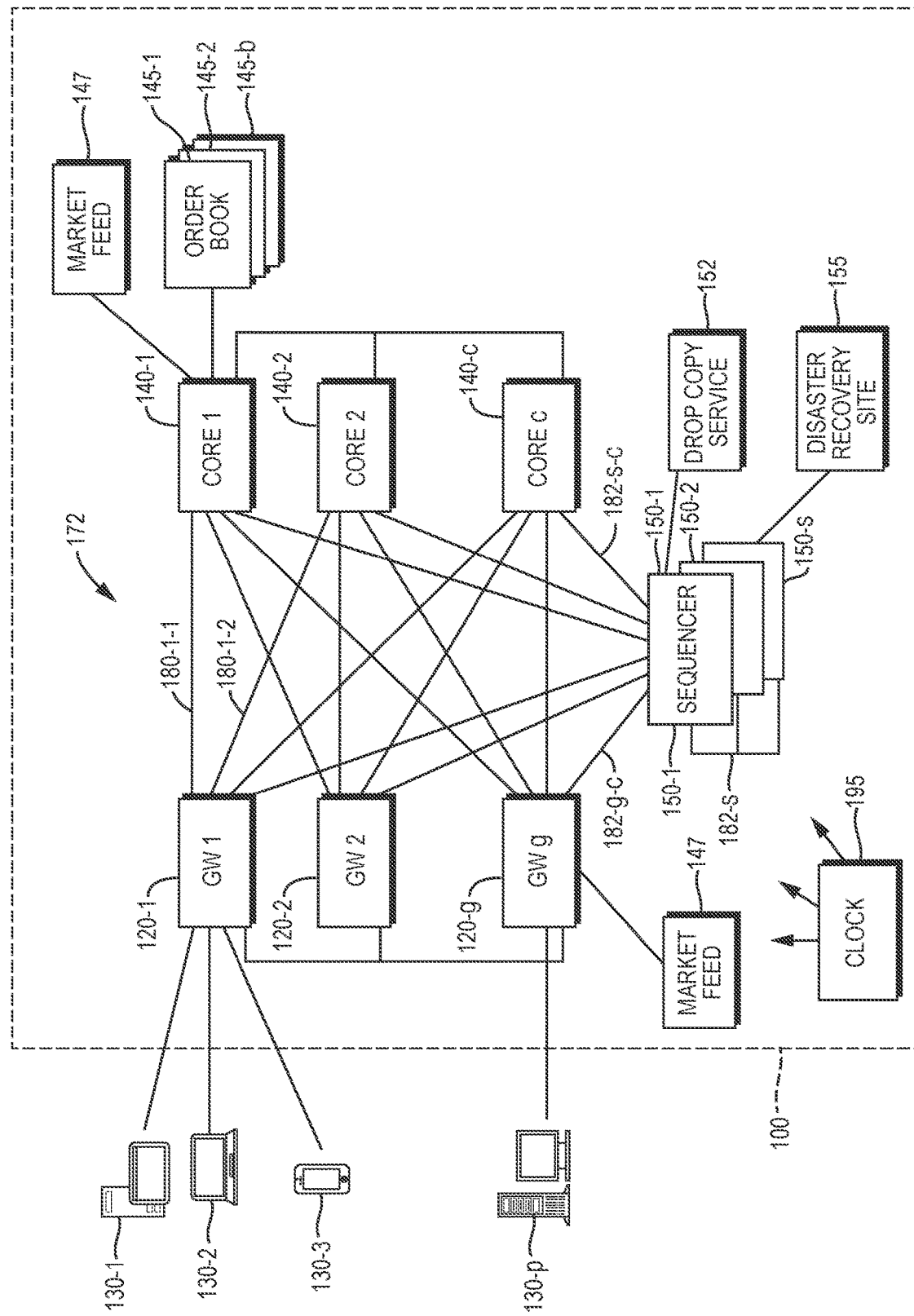
FIG. 1 is a schematic diagram that illustrates an example embodiment of an electronic trading system.

Certain example embodiments will now be described to provide an overall understanding of the principles of the structure, function, and use of the systems, methods and devices disclosed herein. One or more of these embodiments are illustrated in the accompanying drawings. Those skilled in the art will understand that the systems, methods and devices specifically described herein and illustrated in the accompanying drawings are non-limiting examples, and that the scope of the present disclosure is defined solely by the claims. The features illustrated or described in connection with one example embodiment may be combined with the features of other embodiments. Such modifications and variations are intended to be included within the scope of the present disclosure. In the present disclosure, like-named components of the different embodiments generally have similar features and/or purposes, unless stated otherwise.

Systems and methods are disclosed herein that provide low latency data communication with improved physical link layer reliability. Instead of using error correction, reliability is achieved through repeated retransmission of data at the physical layer whenever a data connection is idle (e.g., no new data to send). In some embodiments, the transmission of administrative control symbols (e,g., "idles," "commas", etc.) can be suppressed or otherwise reduced to allow some of the available connection bandwidth to be used for data redundancy and fault tolerance through the repeated retransmission of data as described in more detail below. Accordingly, instead of executing time-consuming error correcting routines, a receive node can discard an erroneous data frame and process at least one repeat frame that carries the same data payload. As discussed in greater detail below, sequence numbers or other repeat indicators can be used to distinguish original frames from repeat frames and/or for identifying which frames carry the same data payload. Preferably, the location of a sequence number can be chosen such that the sequence number can be stripped out, ignored, or modified in order to hide the processing from layers above the physical layer.

In a preferred embodiment, such as an electronic trading system, the average bandwidth utilization of a communication link or other connection for data transmission can be approximately 10% or less, and in some systems, 1% or less. Put another way, the connection can be idle 90% of the time or more. Thus, any increase in bandwidth utilization due to retransmission of data for redundancy and fault tolerance is likely to have minimal effect on the connection bandwidth available for original data transmissions.

In some embodiments, a high speed electronic trading system can be adapted or modified to provide low latency data communication with improved physical link layer reliability through repeated physical layer retransmission of data. The example high speed electronic trading systems described herein can provide a market where orders to buy and sell financial instruments (such as stocks, bonds, commodities, futures, options, and the like) are traded among market participants (such as traders and brokers). The electronic trading system exhibits low latency, fairness, fault tolerance, and other features more fully described below.

The electronic trading system is primarily responsible for "matching" orders to one another. In one example, an offer to "buy" an instrument is matched to a corresponding counteroffer to "sell". The matched offer and counteroffer must at least partially satisfy the desired price, with any residual unsatisfied quantity passed to another suitable counterorder. Matched orders are then paired and the trade is executed.

Any wholly unsatisfied or partially satisfied orders are maintained in a data structure referred to as an "order book". The retained information regarding unmatched orders can be used by the matching engine to satisfy subsequent orders. An order book is typically maintained for each instrument and generally defines or otherwise represents the state of the market for that particular product. It may include, for example, the recent prices and quantities at which market participants have expressed a willingness to buy or sell.

The results of matching may also be made visible to market participants via streaming data services referred to as market data feeds. A market data feed typically includes individual messages that carry the pricing for each traded instrument, and related information such as volume and other statistics.

FIG. 1 illustrates an example electronic trading system 100 that includes a number of gateways 120-1, 120-2, ..., 120-g (collectively referred to as gateways 120), a set of core compute nodes 140-1, 140-2, ..., 140-c (collectively, the core compute nodes 140 or compute nodes 140), and one or more sequencers 150-1, 150-2, ..., 150-s (collectively, the sequencers 150). In some embodiments, the gateways 120, core compute nodes 140, and sequencers 150 are thus considered to be nodes in electronic trading system 100. As will be described in more detail below, in one embodiment, the gateways 120, compute nodes 140 and sequencers 150 are directly connected to one another, preferably via low latency, dedicated connections 180.

The term "peer" in relation to the discussion of the system 100 refers to another device that generally serves the same function (e.g., "gateway" vs. "core compute node" vs. "sequencer") in electronic trading system 100. For example, gateways 120-2, ..., 120-g are the peers for gateway 120-1, core compute nodes 140-2, ..., 140-c are the peers for core compute node 140-1, and sequencers 150-2, ..., 150-s are the peers for sequencer 150-1.

The electronic trading system 100 processes orders from and provides related information to one or more participant computing devices 130-1, 130-2, ..., 130-p (collectively, the participant devices 130). Participant devices 130 interact with the system 100, and may be one or more personal computers, tablets, smartphones, servers, or other data processing devices configured to display and receive trade order information. The participant devices 130 may be operated by a human via a graphical user interface (GUI), or they may be operated via high-speed automated trading methods running on some physical or virtual data processing platform.

Each participant device 130 may exchange messages with (that is, send messages to and receive messages from) the electronic trading system 100 via connections established with a gateway 120. While FIG. 1 illustrates each participant device 130 as being connected to electronic trading system 100 via a single connection to a gateway 120, it should be understood that a participant device 130 may be connected to electronic trading system 100 over multiple connections to one or more gateway devices 120.

Note that, while each gateway 120-1 may serve a single participant device 130, it typically serves multiple participant devices 130.

The compute nodes 140-1, 140-2, . . . , 140-c (also referred to herein as matching engines 140 or compute engines 140) provide the matching functions described above and may also generate outgoing messages to be delivered to one or more participant devices 130. Each compute node 140 is a high-performance data processor and typically maintains one or more data structures to search and maintain one or more order books 145-1, 145-2 . . . , 145-b. An order book 145-1 may be maintained, for example, for each instrument for which the core compute node 140-1 is responsible. One or more of the compute nodes 140 and/or one or more of the gateways 120 may also provide market data feeds 147. Market data feeds 147 may be broadcast (for example, multicast), to subscribers, which may be participant devices 130 or any other suitable computing devices.

Some outgoing messages generated by core compute nodes 140 may be synchronous, that is, generated directly by a core compute node 140 in response to one or more incoming messages received from one or more participant devices 130, such as an outgoing "acknowledgement message" or "execution message" in response to a corresponding incoming "new order" message. In some embodiments, however, at least some outgoing messages may be asynchronous, initiated by the trading system 100, for example, certain "unsolicited" cancel messages and "trade break" or "trade bust" messages.

Distributed computing environments, such as the electronic trading system 100, can be configured with multiple matching engines operating in parallel on multiple compute nodes 140.

The sequencers 150 ensure that the proper sequence of any order-dependent operations is maintained. To ensure that operations on incoming messages are not performed out of order, incoming messages received at one or more gateways 120, for example, a new trade order message from one of participant devices 130, typically must then pass through at least one sequencer 150 in which they are marked with a sequence identifier. That identifier may be a unique, monotonically increasing value which is used in the course of subsequent processing throughout the distributed system 100 (e.g., electronic trading system 100) to determine the relative ordering among messages and to uniquely identify messages throughout electronic trading system 100. It should be understood, however, that while unique, the identifier is not limited to a monotonically increasing or decreasing value. Once sequenced, the marked incoming messages, that is the sequence-marked messages, are typically then forwarded by sequencer(s) 150 to other downstream compute nodes 140 to perform potentially order-dependent processing on the messages.

In some embodiments, messages may also flow in the other direction, that is, from a core compute node 140 to one or more of the participant devices 130, passing through one or more of the gateways 120. Such outgoing messages generated by a core compute node 140 may also be order-dependent, and accordingly may also typically first pass through a sequencer 150 to be marked with a sequence identifier. The sequencer 150 may then forward the marked response message to the gateways 120 in order to pass on to participant devices 130 in a properly deterministic order.

The use of a sequencer 150 to generate unique sequence numbers ensures the correct ordering of operations is maintained throughout the distributed system 100, regardless of which compute node or set of compute nodes 140 processes the messages. This approach provides "state determinism," to provide fault-tolerance, high availability and disaster recoverability.

It may also be important for a generating node (i.e., a node introducing a new message into the electronic trading system 100, for example by generating a new message and/or by forwarding a message received from a participant device 130) and its peer nodes to receive the sequence number assigned to that message. Receiving the sequence number for a message it generated may be useful to the generating node and its peer nodes not only for processing messages in order according to their sequence numbers, but also to correlate the message generated by the node with the message's identifier that is used throughout the rest of the electronic trading system 100. A subsequent message generated within the electronic trading system 100, while also being assigned its own sequence number, may yet reference one or more sequence numbers of related preceding messages. Accordingly, a node may need to quickly reference (by sequence number) a message the node had itself previously generated, because, for example, the sequence number of the message the node had generated was referenced in a subsequent message.

In some embodiments, the generating node may first send a message to the sequencer 150 and wait to receive the sequence number from the sequencer before the generating node forwards the message to other nodes in electronic trading system 100.

In alternate example embodiments, to avoid at least one hop, which could add undesirable increased latency within electronic trading system 100, after receiving the un-sequenced message from the generating node, sequencer 150 may not only send a sequenced version of the message (e.g., a sequence-marked message) to destination nodes, but may also send substantially simultaneously a sequenced version of the message back to the sending node and its peers. For example, after assigning a sequence number to an incoming message sent from the gateway 120-1 to core compute nodes 140, the sequencer 150 may not only forward the sequenced version of the message to the core compute nodes 140, but may also send a sequenced version of that message back to the gateway 120-1 and the other gateways 120. Accordingly, if any subsequent message generated in a core compute node 140 references that sequence number, any gateway 120 may easily identify the associated message originally generated by gateway 120-1 by its sequence number.

Similarly, in some further embodiments, a sequenced version of an outgoing message generated by and sent from a core compute node 140 to gateways 120, and sequenced by sequencer 150, may be forwarded by sequencer 150 both to gateways 120 and back to core compute nodes 140.

Some embodiments may include multiple sequencers 150 for high availability, for example, to ensure that another sequencer is available if the first sequencer fails. For embodiments with multiple sequencers 150 (e.g., a currently active sequencer 150-1, and one or more standby sequencers 150-2, ..., 150-s), the currently active sequencer 150-1 may maintain a system state log (not shown) of all the messages that passed through sequencer 150-1, as well as the messages' associated sequence numbers. This system state log may be continuously or periodically transmitted to the standby sequencers to provide them with requisite system state to allow them to take over as an active sequencer, if necessary.

The system state log may also be continually or periodically replicated to one or more sequencers in a standby replica electronic trading system (not shown in detail) at a disaster recovery site 155, thereby allowing electronic trading to continue with the exact same state at the disaster recovery site 155, should the primary site of system 100 suffer catastrophic failure.

In some embodiments, the system state log may also be provided to a drop copy service 152, which may be implemented by one or more of the sequencers, and/or by one or more other nodes in the electronic trading system 100. The drop copy service 152 may provide a record of daily trading activity through electronic trading system 100 that may be delivered to regulatory authorities and/or clients, who may, for example be connected via participant devices 130. In alternate embodiments, the drop copy service 152 may be implemented on one or more gateways 120. Furthermore, in addition to or instead of referencing the system state log, the drop copy service 152 may provide the record of trading activity based on the contents of incoming and outgoing messages sent throughout electronic trading system 100. For example, in some embodiments, a gateway 120 implementing the drop copy service 152 may receive from the sequencer 150 (and/or from core compute nodes 140 and other gateways 120) all messages exchanged throughout the electronic trading system 100. A participant device 130 configured to receive the record of daily trading activity from the drop copy service 152 may not necessarily also be sending orders to and utilizing a matching function of electronic trading system 100.

Messages exchanged between participant devices 130 and gateways 120 may be according to any suitable protocol that may be used for financial trading (referred to for convenience as, "financial trading protocol"). For example, the messages may be exchanged according to custom protocols or established standard protocols, including both binary protocols (such as Nasdaq OUCH and NYSE UTP), and text-based protocols (such as NYSE FIX CCG). In some embodiments, the electronic trading system 100 may support exchanging messages simultaneously according to multiple financial trading protocols, including multiple protocols simultaneously on the same gateway 120. For example, participant devices 130-1, 130-2, and 130-3 may simultaneously have established trading connections and may be exchanging messages with gateway 120-1 according to Nasdaq Ouch, NYSE UTP, and NYSE FIX CCG, respectively.

Furthermore, in some embodiments, the gateways 120 may translate messages according to a financial trading protocol received from a participant device 130 into a normalized message format used for exchanging messages among nodes within the electronic trading system 100. The normalized trading format may be an existing protocol or may generally be of a different size and data format than that of any financial trading protocol used to exchange messages with participant devices 130. For example, the normalized trading format, when compared to a financial trading protocol of the original incoming message received at the gateway 120 from a participant 130, may include in some cases one or more additional fields or parameters, may omit one or more fields or parameters, and/or each field or parameter of a message in the normalized format may be of a different data type or size than the corresponding message received at gateway 120 from the participant device 130. Similarly, in the other direction, gateways 120 may translate outgoing messages generated in the normalized format by electronic trading system 100 into messages in the format of one or more financial trading protocols used by participant devices 130 to communicate with gateways 120.

In the era of high-speed trading, in which microseconds or even nanoseconds are consequential, participants 130 exchanging messages with the electronic trading system 100 are often very sensitive to latency, preferring low, predictable latency. The arrangement shown in FIG. 1 accommodates this requirement by providing a point-to-point mesh 170 architecture between at least each of the gateways 120 and each of the compute nodes 140. In some embodiments, each gateway 120 in the mesh 172 may have a dedicated high-speed direct connection 180 to the compute nodes 140 and the sequencers 150.

For example, dedicated connection 180-1-1 is provided between gateway 1 120-1 and core compute node 1 140-1, dedicated connection 180-1-2 between gateway 1 120-1 and compute node 2 140-2, and so on, with example connection 180-g-c provided between gateway 120-g and compute node 140-c, and example connection 180-s-c provided between sequencer 150 and core c 140-c.

It should be understood that each dedicated connection 180 in the mesh 172 is, in some embodiments, a point-to-point direct connection that does not utilize a shared switch. A dedicated or direct connection may be referred to interchangeably herein as a direct or dedicated "link" and is a direct connection between two end points that is dedicated (e.g., non-shared) for communication therebetween. Such a dedicated/direct link may be any suitable interconnect(s) or interface(s), such as disclosed further below, and is not limited to a network link, such as wired Ethernet network connection or other type of wired or wireless network link. The dedicated/direct connection/link may be referred to herein as an end-to-end path between the two end points. Such an end-to-end path may be a single connection/link or may include a series of connections/links; however, bandwidth of the dedicated/direct connection/link in its entirety, that is, from one end point to another end point, is non-shared and neither bandwidth nor latency of the dedicated/direct connection/link can be impacted by resource utilization of element(s) if so traversed. For example, the dedicated/direct connection/link may traverse one or more buffer(s) or other elements that are not bandwidth or latency impacting based on utilization thereof. The dedicated/direct connection/link would not, however, traverse a shared network switch as such a switch can impact bandwidth and/or latency due to its shared usage.

For example, in some embodiments, the dedicated connections 180 in the mesh 172 may be provided in a number of ways, such as a 10 Gigabit Ethernet (GigE), 25 GigE, 40 GigE, 100 GigE, InfiniBand, Peripheral Component Interconnect-Express (PCIe), RapidIO, Small Computer System Interface (SCSI), FireWire, Universal Serial Bus (USB), High Definition Multimedia Interface (HDMI), or custom serial or parallel busses.

Therefore, although the compute engines 140, gateways 120, sequencers 150 and other components may sometimes be referred to herein as "nodes", the use of terms such as "compute node" or "gateway node" or "sequencer node" or "mesh node" should not be interpreted to mean that particular components are necessarily connected using a network link, since other types of interconnects or interfaces are possible. Further, a "node," as disclosed herein, may be any suitable hardware, software, firmware component(s), or combination thereof, configured to perform the respective function(s) set forth for the node. As explained in more detail below, a node may be a programmed general purpose processor, but may also be a dedicated hardware device, such as a field programmable gate array (FPGA), application specific integrated circuit (ASIC), or other hardware device or group of devices, logic within a hardware device, printed circuit board (PCB), or other hardware component.

It should be understood that nodes disclosed herein may be separate elements or may be integrated together within a single element, such as within a single FPGA, ASIC, or other element configured to implement logic to perform the functions of such nodes as set forth herein. Further, a node may be an instantiation of software implementing logic executed by general purpose computer and/or any of the foregoing devices.

Conventional approaches to connecting components, such as the compute engines 140, gateways 120, and sequencers 150 through one or more shared switches, do not provide the lowest possible latency. These conventional approaches also result in unpredictable spikes in latency during periods of heavier message traffic.

In an example embodiment, dedicated connections 180 are also provided directly between each gateway 120 and each sequencer 150, and between each sequencer 150 and each core compute node 140. Furthermore, in some embodiments, dedicated connections 180 are provided among all the sequencers, so that an example sequencer 150-1 has a dedicated connection 180 to each other sequencer 150-2, ..., 150-s. While not pictured in FIG. 1, in some embodiments, dedicated connections 180 may also be provided among all the gateways 120, so that each gateway 120-1 has a dedicated connection 180 to each other gateway 120-2, ..., 120-g. Similarly, in some embodiments, dedicated connections 180 are also provided among all the compute nodes 140, so that an example core compute node 140-1 has a dedicated connection 180 to each other core compute node 140-2, ..., 140-c.

It should also be understood that a dedicated connection 180 between two nodes (e.g., between any two nodes 120, 150, or 140) may in some embodiments be implemented as multiple redundant dedicated connections between those same two nodes, for increased redundancy and reliability. For example, the dedicated connection 180-1-1 between gateway 120-1 and core compute node 140-1 (e.g., Core 1) may actually be implemented as a pair of dedicated connections.

In addition, according to some embodiments, any message sent out by a node is sent out in parallel to all nodes directly connected to it in the point-to-point mesh 172. Each node in the mesh 172 may determine for itself, for example, based on the node's configuration, whether to take some action upon receipt of a message, or whether instead simply to ignore the message. In some embodiments, a node may never completely ignore a message; even if the node, due to its configuration, does not take substantial action upon receipt of a message, it may at least take minimal action, such as consuming any sequence number assigned to the message by the sequencer 150. That is, in such embodiments, the node may keep track of a last received sequence number to ensure that when the node takes more substantial action on a message, it does so in proper sequenced order.

For example, a message containing an order to "Sell 10 shares of Microsoft at $190.00" might originate from participant device 130-1, such as a trader's personal computer, and arrive at gateway 120-1 (i.e., GW 1). That message will be sent to all core compute nodes 140-1, 140-2, ..., 140-c even though only core compute node 140-2 is currently performing matching for Microsoft orders. All other core compute nodes 140-1, 140-3, ..., 140-c may upon receipt ignore the message or only take minimal action on the message. For example, the only action taken by 140-1, 140-3, ..., 140-c may be to consume the sequence number assigned to the message by the sequencer 150-1. That message will also be sent to all of the sequencers 150-1, 150-2, ..., 150-s even though a single sequencer (in this example, sequencer 150-1) is the currently active sequencer servicing the mesh. The other sequencers 150-2, ..., 150-s also received the message to allow them the opportunity to take over as the currently active sequencer should sequencer 150-1 (the currently active sequencer) fail, or if the overall reliability of the electronic trading system 100 would increase by moving to a different active sequencer. One or more of the other sequencers (sequencer 150-2 for example) may also be responsible for relaying system state to the disaster recovery site 155. The disaster recovery site 155 may include a replica of electronic trading system 100 at another physical location, the replica comprising physical or virtual instantiations of some or all of the individual components of electronic trading system 100.

By sending each message out in parallel to all directly connected nodes, the system 100 reduces complexity and also facilitates redundancy and high availability. If all directly connected nodes receive all messages by default, multiple nodes can be configured to take action on the same message in a redundant fashion. Returning to the example above of the order to "Sell 10 shares of Microsoft at $190.00", in some embodiments, multiple core compute nodes 140 may simultaneously perform matching for Microsoft orders. For example, both core compute node 140-1 and core compute node 140-2 may simultaneously perform matching for Microsoft messages, and may each independently generate, after having received the incoming message of the "Sell" order, a response message such as an acknowledgement or execution message that each of core compute node 140-1 and core compute node 140-2 sends to the gateways 120 through the sequencer(s) 150 to be passed on to one or more participant devices 130.

Because of the strict ordering and state determinism assured by the sequencer(s) 150, it is possible to guarantee that each of the associated response messages independently generated by and sent from the core compute nodes 140-1 and 140-2 are substantially equivalent; accordingly, the architecture of electronic trading system 100 readily supports redundant processing of messages, which increases the availability and resiliency of the system. In such embodiments, gateways 120 may receive multiple associated outgoing messages from core compute nodes 140 for the same corresponding incoming message. Due to the fact that it can be guaranteed that these multiple associated response messages are equivalent, the gateways 120 may simply process only the first received outgoing message, ignoring subsequent associated outgoing messages corresponding to the same incoming message. In some embodiments, the "first" and "subsequent" messages may be identified by their associated sequence numbers, as such messages are sequence-marked messages. Allowing the gateways 120 to take action on the first of several associated response messages to reach them may therefore also improve the overall latency of the system.

Such a point-to-point mesh 172 architecture of system 100, besides supporting low, predictable latency and redundant processing of messages, also provides for built-in redundant, multiple paths. As can be seen, there exist multiple paths between any gateway 120 and any compute node 140. Even if a direct connection 180-1-1 between gateway 120-1 and compute node 140-1 becomes unavailable, communication is still possible between those two elements via an alternate path, such as by traversing one of the sequencers 150 instead. Thus, more generally speaking, there exist multiple paths between any node and any other node in the mesh 172.

Furthermore, this point-to-point mesh architecture inherently supports another important goal of a financial trading system, namely, fairness. The point-to-point architecture with direct connections between nodes ensures that the path between any gateway 120 and any core compute node 140, or between the sequencer 150 and any other node has identical or, at least very similar latency. Therefore, two incoming messages sent out to the sequencer 150 at the same time from two different gateways 120 should reach the sequencer 150 substantially simultaneously. Similarly, an outgoing message being sent from a core compute node 140 is sent to all gateways 120 simultaneously, and should be received by each gateway at substantially the same time. Because the topology of the point-to-point mesh does not favor any single gateway 120, chances are minimized that being connected to a particular gateway 120 may give a participant device 130 an unfair advantage or disadvantage.

Additionally, the point-to-point mesh architecture of system 100 allows for easily reconfiguring the function of a node, that is, whether a node is currently serving as a gateway 120, core compute node 140 or sequencer 150. It is particularly easy to perform such reconfiguration in embodiments in which each node has a direct connection between itself and each other node in the point-to-point mesh. When each node is connected via a direct connection to each other node in the mesh, no re-wiring or re-cabling of connections 180 (whether physical or virtual) within the point-to-point mesh 172 is required in order to change the function of a node in the mesh (for example, changing the function of a node from a core compute node 140 to a gateway 120, or from a gateway 120 to a sequencer 150). In such embodiments, the reconfiguration required that is internal to the mesh 172 may be easily accomplished through configuration changes that are carried out remotely. In the case of a node being reconfigured to serve as a new gateway 120 or being reconfigured from serving as a gateway 120 to another function, there may be some ancillary networking changes required that are external to the mesh 172, but the internal wiring of the mesh may remain intact.

Accordingly, in some embodiments, the reconfiguration of the function of a node may be accomplished live, even dynamically, during trading hours. For example, due to changes on characteristics of the load of electronic trading system 100 or new demand, it may be useful to reconfigure a core compute node 140-1 to instead serve as an additional gateway 120. After some possible redistribution of state or configuration to other compute nodes 140, the new gateway 120 may be available to start accepting new connections from participant devices 130.

In some embodiments, lower-speed, potentially higher latency shared connections 182 may be provided among the system components, including among the gateways 120 and/or the core compute nodes 140. These shared connections 182 may be used for maintenance, control operations, management operations, and/or similar operations that do not require very low latency communications, in contrast to messages related to trading activity carried over the dedicated connections 180 in the mesh 172. Shared connections 182, carrying non-trading traffic, may be over one or more shared networks and via one or more network switches, and nodes in the mesh may be distributed among these shared networks in different ways. For example, in some embodiments, gateways 120 may all be in a gateway-wide shared network 182-g, compute nodes 140 may be in their own respective compute node-wide shared network 182-c, and sequencers 150 may be in their own distinct sequencer-wide shared network 182-s, while in other embodiments all the nodes in the mesh may communicate over the same shared network for these non-latency sensitive operations.

Distributed computing environments such as electronic trading system 100 sometimes rely on high resolution clocks to maintain tight synchronization among various components. To that end, one or more of the nodes 120, 140, 150 might be provided with access to a clock, such as a high-resolution GPS clock 195 in some embodiments.

Figure 2:
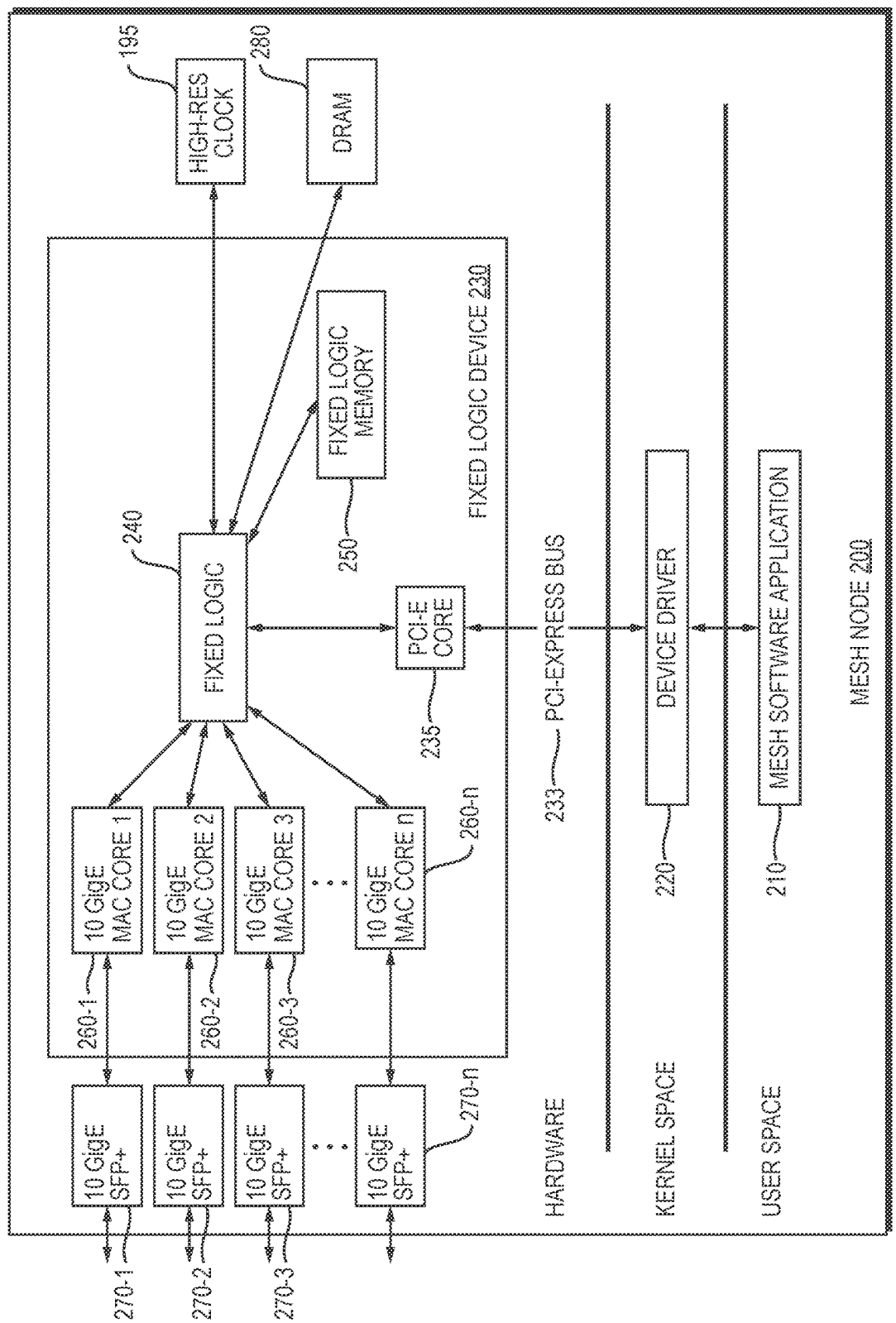
FIG. 2 is a schematic diagram that illustrates an example embodiment of a mesh node in the example electronic trading system of FIG. 1.

For purposes of the following discussion, gateways 120, compute nodes 140, and sequencers 150 connected in the mesh 172 may be referred to as "Mesh Nodes". FIG. 2 illustrates an example embodiment of a Mesh Node 200 in the point-to-point mesh 172 architecture of electronic trading system 100. Mesh node 200 could represent a gateway 120, a sequencer 150, or a core compute node 140, for example. Although in this example, functionality in the Mesh Node 200 is distributed across both hardware and software, Mesh Node 200 may be implemented in any suitable combination of hardware and software, including pure hardware and pure software implementations, and in some embodiments, any or all of gateways 120, compute nodes 140, and/or sequencers 150 may be implemented with commercial off-the-shelf components.

In the embodiment illustrated by FIG. 2, in order to achieve low latency, some functionality is implemented in hardware in Fixed Logic Device 230, while other functionality is implemented in software in Device Driver 220 and Mesh Software Application 210. Fixed Logic Device 230 may be implemented in any suitable way, including an Application-Specific Integrated Circuit (ASIC), an embedded processor, or a Field. Programmable Gate Array (FPGA). Mesh Software Application 210 and Device Driver 220 may be implemented as instructions executing on one or more programmable data processors, such as central processing units (CPUs). Different versions or configurations of Mesh Software Application 210 may be installed on Mesh Node 200 depending on its role. For example, based on whether Mesh Node 200 is acting as a gateway 120, sequencer 150, or core compute node 140, a different version or configuration of Mesh Software Application 210 may be installed.

While any suitable physical communications link layer may be employed, (including USK Peripheral Component Interconnect (PCI)-Express, High Definition Multimedia Interface (HDMI), 10 Gigabit Ethernet (GigE), 25 GigE, 40 GigE, 100 CligE, or InfiniBand (IB), over fiber or copper cables), in this example, Mesh Node 200 has multiple low latency 10 Gigabit Ethernet SFP+ connectors (interfaces) 270-1, 270-2, 270-3, . . . , 270-n, (known collectively as connectors 270). Connectors 270 may be directly connected to other nodes in the point-to-point mesh via dedicated connections 180, connected via shared connections 182, and/or connected to participant devices 130 via a gateway 120, for example. These connectors 270 are electronically coupled in this example to 10 GigE MAC Cores 260-1, 260-2, 260-3, . . . , 260-*n*, (known collectively as GigE Cores 260), respectively, which in this embodiment are implemented by Fixed Logic Device 230 to ensure minimal latency. In other embodiments, 10 GigE MAC Cores 260 may be implemented by functionality outside Fixed Logic Device 230, for example, in PCI-E network interface card adapters.

In some embodiments, Fixed Logic Device 230 may also include other components. In the example of FIG. 2, Fixed Logic Device 230 also includes a Fixed Logic 240 component. In some embodiments, fixed Logic component 240 may implement different functionality depending on the role of Mesh Node 200, for example, whether it is a gateway 120, sequencer 150, or core compute node 140. Also included in Fixed Logic Device 230 is Fixed Logic Memory 250, which may be a memory that is accessed with minimal latency by Fixed Logic 240. Fixed Logic Device 230 also includes a PCI-E Core 235, which may implement PCI Express functionality. In this example, PCI Express is used as a conduit mechanism to transfer data between hardware and software, or more specifically, between Fixed Logic Device 240 and the Mesh Software Application 210, via Device Driver 220 over PCI Express Bus 233. However, any suitable data transfer mechanism between hardware and software may be employed, including Direct Memory Access (DMA), shared memory buffers, or memory mapping.

In some embodiments, Mesh Node 200 may also include other hardware components. For example, depending on its role in the electronic trading system 100, Mesh Node 200 in some embodiments may also include High-Resolution Clock 195 (also illustrated in and discussed in conjunction with FIG. 1) used in the implementation of high-resolution clock synchronization among nodes in electronic trading system 100. A Dynamic Random-Access Memory (DRAM) 280 may also be included in Mesh Node 200 as an additional memory in conjunction with Fixed Logic Memory 250. DRAM 280 may be any suitable volatile or non-volatile memory, including one or more random-access memory banks, hard disk(s), and solid-state disk(s), and accessed over any suitable memory or storage interface.

Figure 3:
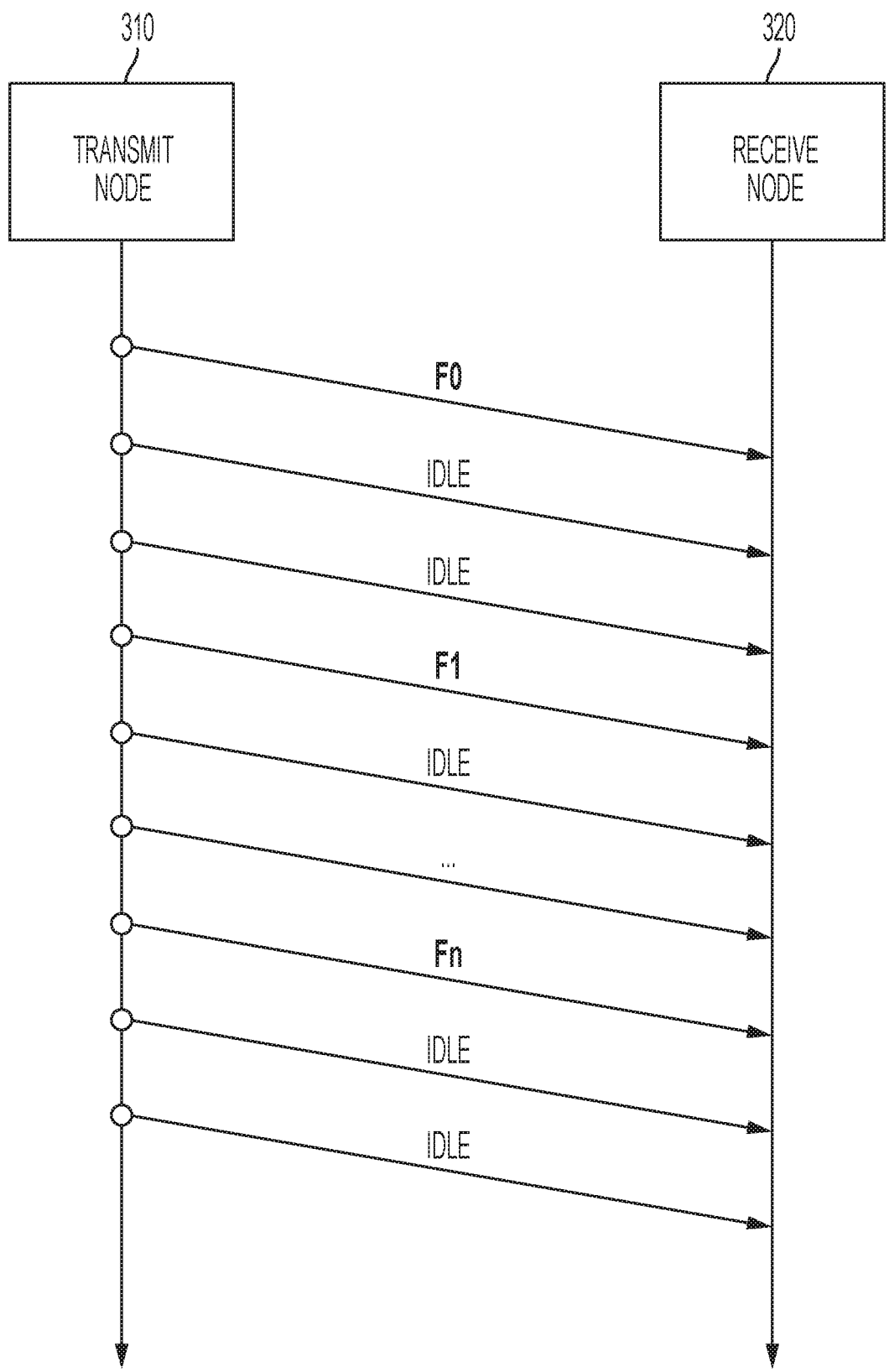
FIG. 3 is a timing diagram that illustrates a conventional example of data communication according to a physical layer protocol.

FIG. 3 is a timing diagram that illustrates a conventional example of data communication according to a physical layer protocol. As shown in this example, a transmit node 310 transmits a stream of symbols to a receive node 320. The symbol stream can include symbol-encoded frames F0, F1, . . . , Fn, each frame encapsulating a data payload. Some physical layer protocols, such as the Ethernet Physical Coding Sublayer (PCS), continue to transmit certain administrative control symbols, such as idle symbols IDLE, even when there is no data to transmit.

When the receive node 320 receives a symbol stream of encoded data frames, the frame is decoded and checked for errors (e.g., frame checksum errors). Frame errors can be corrected using Forward Error Correction (FEC) techniques. As discussed above, FEC techniques can add significant processing latencies that may limit its usefulness for certain types of applications, including but not limited to electronic trading.

Systems and methods are disclosed herein that provide low latency data communication with improved physical link layer reliability through repeated physical layer retransmission of data over a data connection whenever the connection is idle (i.e., no new data to send). In some embodiments, such as an electronic trading system, the data connection can have an idle bandwidth that exceeds its data bandwidth. Put another way, the connection is idle more often than it is actively transmitting data. In some embodiments, the transmission of administrative control symbols (e.g., "idles," "commas", etc.) can be suppressed or otherwise reduced to take advantage of some of the available connection bandwidth for data redundancy and fault tolerance through the repeated retransmission of data as described in more detail below. Accordingly, instead of executing time-consuming error correcting routines, a receive node can discard an erroneous data frame and process at least one repeat frame that encapsulates the same data payload. In some embodiments, the data payload can include data that is formatted according the specifications of one or more higher layer protocols (e.g., Internet Protocol, etc.) or any other user data.

Figure 4:
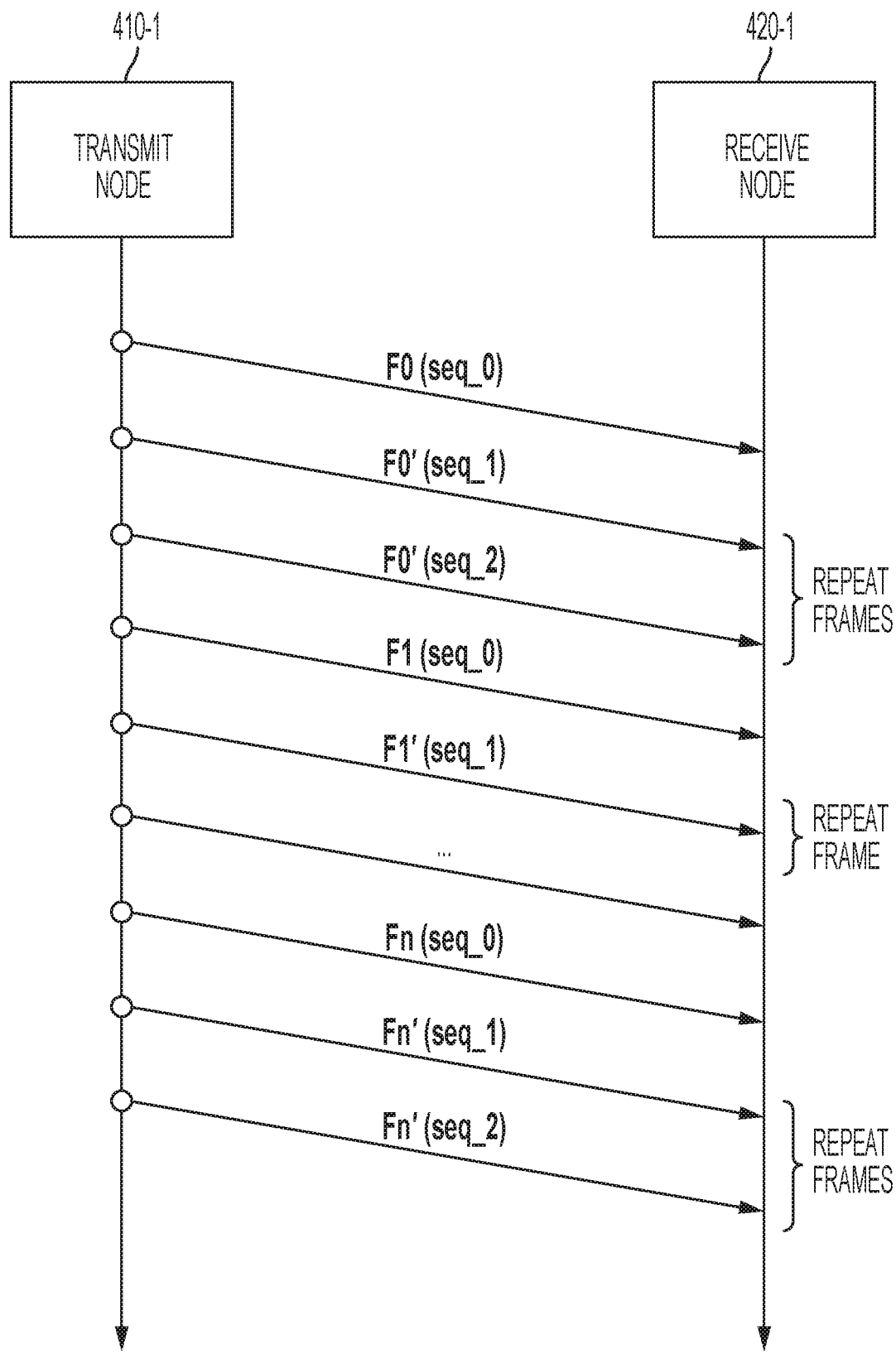
FIG. 4 is a timing diagram that illustrates a method of reliable low latency data communication that involves transmission of repeat frames according to an embodiment.

FIG. 4 is a timing diagram that illustrates a method of reliable low latency data communication that involves transmission of repeat frames according to an embodiment. In the illustrated embodiment, a transmit node 410-1 transmits a data payload in an original data frame to a receive node 420-1 and then repeatedly transmits the same data payload in one or more repeat frames without waiting for any acknowledgement (e.g., ACK or NACK) of the original frame from the receive node 420-1. In some embodiments, one or more idle, comma, or other control signals can be suppressed to transmit the repeat frames. In some embodiments, the transmit node 410-1 can stop sending the repeat frames when new data is ready to be transmitted in another original frame, when a maximum number of repeat frames is reached, or when the transmit node 410-1 receives a positive acknowledgement of successful receipt of the transmitted data (e.g., ACK) from the receive node 420-1.

For purposes of example, FIG. 4 shows two repeat frames F0' being transmitted with the same data payload as original frame F0, one repeat frame data F1' being transmitted with the same payload as original frame F1, and two repeat frames Fn' being transmitted with the same payload as original frame Fn. Accordingly, if the data payload in an original frame is received with errors, the receive node 420-1 can attempt to recover the payload in one of the subsequently sent repeat frames.

In some embodiments, it can be useful to identify an original frame and its repeat frames by modifying the frames to include a repeat indicator, such as a sequence number or a Boolean value. For example, in the illustrated embodiment, an incrementing sequence number can be included in the frames to distinguish an original frame from its repeat frames. As described in more detail below, the original or first frame that carries a particular payload can include an initial sequence number (e.g., seq_0). For each subsequent repeat frame, the sequence number can be incremented to a next sequence number (e.g., seq_1, seq_2, etc.). When new data is ready for transmission or the maximum number of repeat frames has been sent, the sequence number can be reset to the initial sequence number for identifying a next original data frame and incremented for each of its repeat frames. For example, as shown in FIG. 4, the sequence number is reset from the sequence number for repeat frame F0' (i.e., seq_2) to the initial sequence number (i.e., seq_0) when new data is ready for transmission in another original frame F1.

In some embodiments, the sequence numbers can be defined as a single word or bit sequence having a predefined length. The bit sequence length can be limited by a desired number of possible repeat frames for every original frame. For example, in some embodiments, the length of the sequence number can range from a single bit to a byte, or more. Referring to the example embodiment of FIG. 4, where the sequence number is a single bit, there can be only one repeat frame. Where the sequence number is four bits, there can be up to a possible 15 repeat frames for every original frame. In some embodiments, the length of the bit sequence can be limited by a location of the sequence number within the frames. In some embodiments, the location of a sequence number can be chosen such that the sequence number can be stripped out, ignored, or modified in order to hide the processing from upper layer data processing (e.g., data link, network, and/or transport layer data processing).

Although the example embodiments disclosed herein use sequence numbers as a repeat indicator, any unique identifier can be used for identifying an original frame and its repeat frames that carry the same payload. For example, in some embodiments, the repeat indicator included in the frames can be a Boolean value that is set to '0' or FALSE for original frames and '1' or TRUE for repeat frames.

Figure 5A:
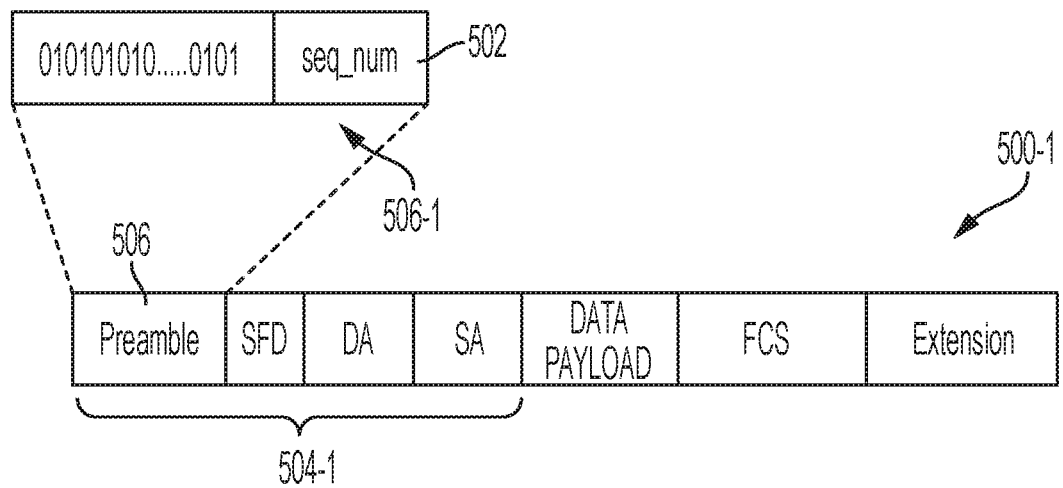
FIGS. 5A, 5B, and 5C illustrate possible locations for inserting a sequence number within a data frame.
Figure 5B:
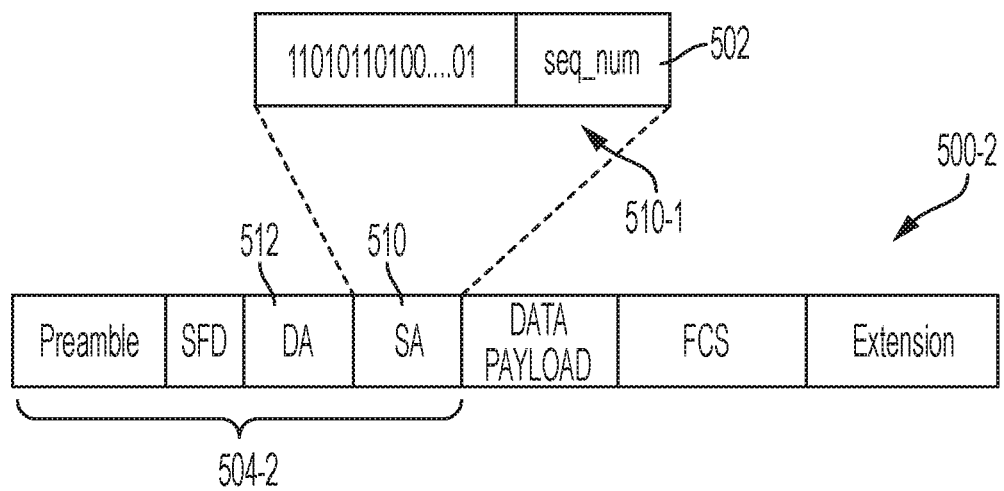
Figure 5C:
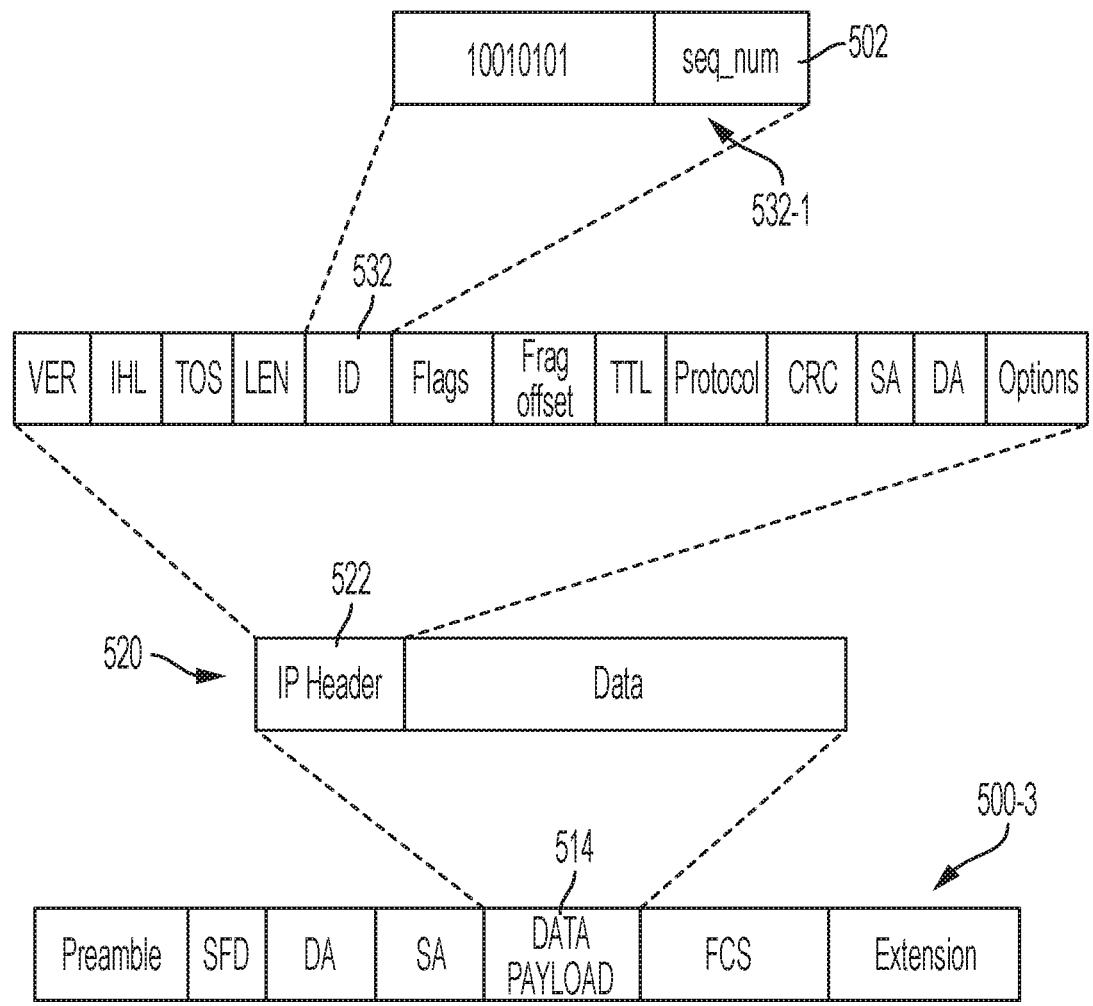

FIGS. 5A, 5B, and 5C illustrate possible locations for inserting a sequence number within a data frame. Although the data frame is shown as an Ethernet type (Layer 2) frame in the illustrated embodiments, persons skilled in the art will recognize that the disclosures provided herein can be adapted and/or modified for other data frame types, including without limitation InfiniBand, Universal Serial Bus (USB), PCI Express (PCI-e), and High-Definition Multimedia Interface (HDMI).

In some embodiments, a sequence number 502 can be inserted within a frame header portion of an Ethernet type frame as shown in the example embodiments of FIGS. 5A and 5B. For example, referring to FIG. 5A, the sequence number 502 can be inserted in the preamble 506 of the frame header 504-1 for an Ethernet type frame 500-1. The preamble 506 typically consists of a 56-bit pattern of alternating 1 and 0 bits for bit-level receive clock synchronization. In some embodiments, the sequence number 502 can replace any portion of the preamble 506. For example, as shown, the sequence number 502 can replace a least significant bit (LSB) portion of the preamble 506-1. In some embodiments, the preamble 506 can be modified to include multiple copies of the sequence number for redundancy purposes. As discussed below in connection with FIG. 11A, the sequence number can be added to the preamble of the Ethernet frame header by a Ethernet Physical Coding Layer (PCS) or other physical layer transmit engine after the frame is generated without having to recalculate the frame checksum 508 of the frame 500.

Referring to the example embodiment of FIG. 5B, the sequence number 502 can be inserted in a source address portion 510 or a destination address portion 512 of a frame header 504-2 of an Ethernet type frame 500-2. Each address portion 510 and 512 typically consists of a 6-byte field containing the Media Access Control (MAC) address for respectively identifying a transmit node (e.g., 410-1) and a receive node (e.g. 420-1). In some embodiments, the sequence number 502 can replace any portion of the source or destination address. For example, as shown, the sequence number 502 can replace a least significant bit (LSB) portion of the source address 510-1. As discussed below in connection with FIG. 11B, the sequence number can be added to one of the node address portions by a Ethernet Media Access Control (MAC) or other data link layer transmit engine while generating of an original or repeat frame.

In some embodiments, a sequence number 502 can be inserted within a header portion of a data packet formatted according to the specification of a network layer protocol, such as but not limited to the Internet Protocol (IP). For example, FIG. 5C illustrates an Ethernet type data frame 500-3 having a data payload 514 that encapsulates an IP packet 520. As shown, the sequence number 502 can be inserted in an Identification field (ID) 532 of the IP header 522 for the IP packet 520, In Internet Protocol version 4 (IPv4), the ID field 532 typically consists of 16 bits that are unique for every datagram for a given source address, destination address, and protocol and does not repeat during the maximum datagram lifetime (MDL) of the packet. In some embodiments, the sequence number 502 can replace any portion of the ID field 532 in the IP header 522. For example, as shown, the sequence number 502 can replace a least significant bit (LSB) portion of the ID field 532-1. As discussed below in connection with FIG. 11C, the sequence number can be inserted into the II) field by an IP transmit engine while generating an IP packet.

Figure 6:
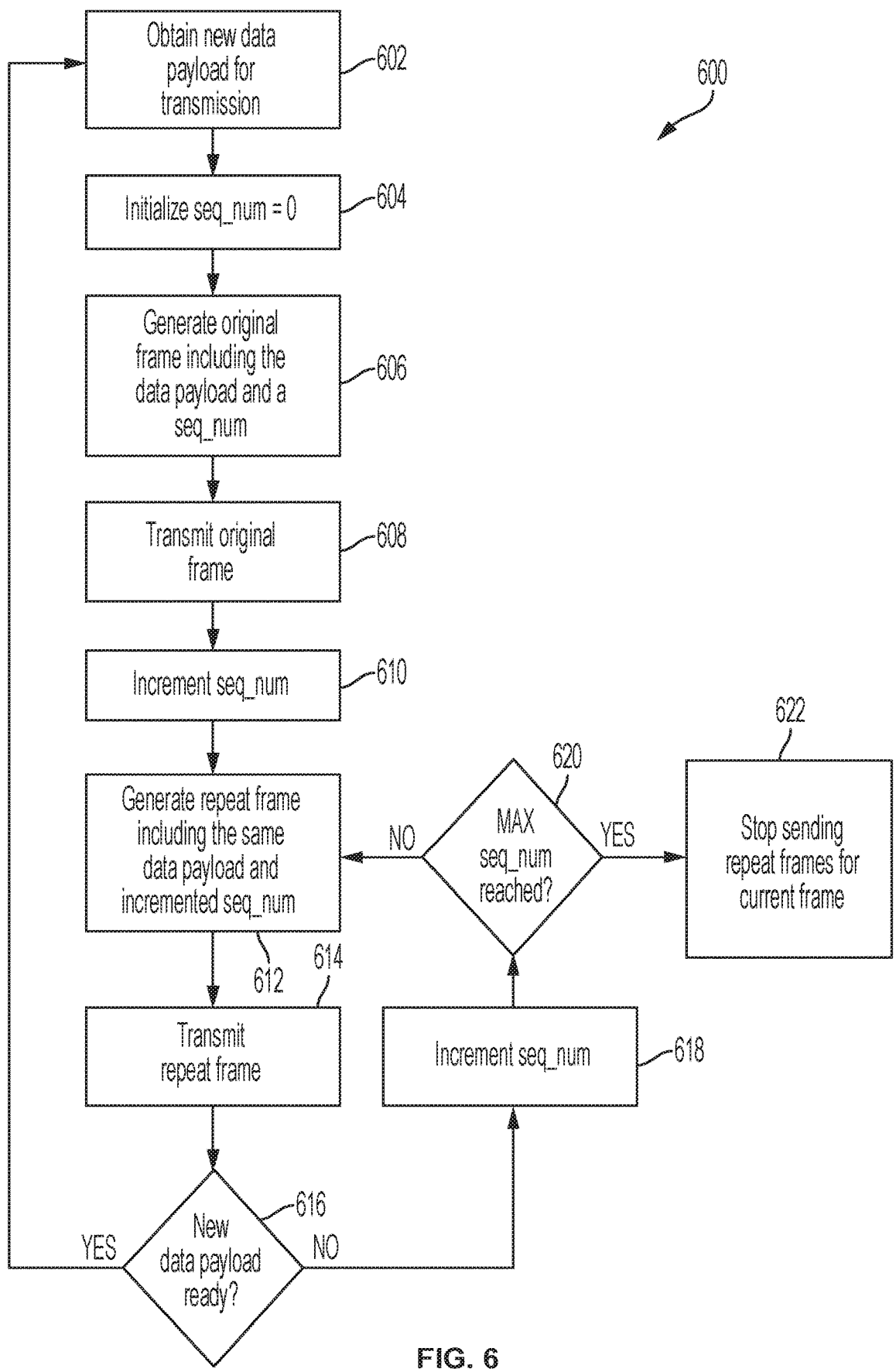
FIG. 6 is a flow diagram that illustrates an example embodiment of a transmit process for reliable low latency data communication.

FIG. 6 is a flow diagram that illustrates an example embodiment of a transmit process 600 for reliable low latency data communication. As discussed above in connection with FIG. 4, the sequence number can be set to an initial sequence number (e.g., seq_0) for an original (or first) frame carrying a new data payload and subsequently incremented for each repeat frame that encapsulate the same data payload. In some embodiments, the process 600 can be performed by a processor or any fixed logic in a transmit node 410-1 (e.g., Mesh Node 200 of FIG. 2).

At block 602, the transmit node 410-1 processor can obtain a new data payload for transmission to a receive node. In some embodiments, the new data payload can be a data packet formatted according to the specifications of a transport/network protocol (e.g., TCP/IP, UDP/IP, etc.)

At block 604, the transmit node 410-1 processor can set the sequence number to an initial sequence number (e.g., seq_0). As discussed above, the sequence numbers can be defined as a single word or bit sequence having a predefined length. In some embodiments, the length of the sequence number can range from a single bit to a byte, or more. In some embodiments, the bit sequence length can restrict the maximum number of repeat frames that can be transmitted for every original frame. For example, where the sequence number is four bits, the maximum number of possible repeat frames can be limited to 15 for any original frame. In some other embodiments, the bit sequence length does not affect the maximum number of possible repeat frames.

At block 606, the transmit node 410-1 processor can generate an original frame that encapsulates the new data payload received at block 602. The original frame can also be modified or adapted to include the initial sequence number (e.g., seq_0) provided at block 604. As discussed above in connection with FIGS. 5A and 5B, in some embodiments, the sequence number (e.g., 502) can be inserted at any suitable location within the frame header (e.g., preamble 506 or address portion 510 or 512). In other embodiments, the sequence number (e.g., 502) can be inserted at any suitable location within the data payload itself (e.g. ID 532 of IP packet header 522) as described in connection with FIG. 5C.

At block 608, the transmit node 410-1 processor transmits the original frame over a data connection to a receive node 420-1. Persons skilled in the art will recognize that a data frame is typically encoded using a symbol encoding scheme (e.g., 8/10b, 64/66b, etc.) prior to transmission over the data connection.

At block 610, the transmit node 410-1 processor increments the sequence number to a next incremented sequence number (e.g., seq_1, seq_2, etc.) to identify a repeat frame that encapsulates the same data as the most original frame having an initial sequence number (e.g., seq_0).

At block 612, the transmit node 410-1 processor generates a repeat frame that includes the incremented sequence number provided at block 610. The incremented sequence number (e.g., seq_1, seq_2, etc.) of the repeat frame is preferably inserted at the same location as the initial sequence number (e.g., seq_0) in the original frame.

At block 614, the transmit node 410-1 processor transmits the repeat frame over the data connection to the receive node 420-1. In some embodiments, the transmit node 410-1 processor transmits the repeat frame to the receive node without waiting for an acknowledgment of the original frame. Put another way, the transmit node 410-1 processor can transmit the repeat frame immediately after the original frame regardless of whether the receive node 420-1 sends a positive or negative acknowledgement that the data payload was received.

In some embodiments, the transmit node 410-1 processor can transmit at least one repeat frame regardless of whether there is a new data payload ready for transmission, thereby providing at least one chance to recover the data from a corrupt original frame using the data from a repeat frame. However, when a new data payload is ready for transmission and at least one repeat frame has been sent for the previous data payload, the transmit node 410-1 processor can be configured to interrupt transmission of a repeat frame currently in progress. In this way, transmission of repeat frames for previous data payloads does not add latency to the transmission of new data payloads. In some embodiments, the transmit node 410-1 processor can send a Start of Packet (SOP) symbol in the middle of the repeat frame transmission as soon as the new data packet is ready. The receive node 420-1 can interpret the SOP symbol as authorization to discard the partially received repeat frame. In some embodiments, an End of Bad Packet (EBP) symbol (as used in InfiniBand and PCI-e) or a custom early termination symbol can be transmitted to interrupt and terminate transmission of a repeat frame. In some embodiments, the transmit node 410-1 processor can skip or otherwise abort transmission of any repeat frames corresponding to an original frame when a new data is ready for transmission. FEC or other scheme can be used to correct any errors in original frames for which no repeat frame is sent.

At determination block 616, the transmit node 410-1 processor checks whether a new data payload is ready for transmission. If there is no new data payload ready to send (i.e., determination block 616=NO), the transmit node increments the sequence number at block 618 and determines whether the maximum sequence number has been reached at determination block 620. If the maximum sequence number has been reached (i.e., determination block 620 YES), the transmit node 410-1 processor can stop sending repeat frames until a new data payload is ready to be sent at block 622. Alternatively, in some embodiments, if the maximum sequence number has been reached (i.e., determination block 620 YES), the transmit node 410-1 processor can continue to send repeat frames by wrapping or resetting the sequence number to one of the sequence numbers assigned to repeat frames (e.g., seq_1, seq_2, etc.) and repeating the process at blocks 612 or 614. Conversely, if the maximum sequence number has not been reached (i.e., determination block 620=NO), the process repeats blocks 612 and 614 to send another repeat frame to the receive node. If there is a new data payload ready to send, the process repeats blocks 602-614 to send the new data payload in another original frame and at least one repeat frame.

Figure 7:
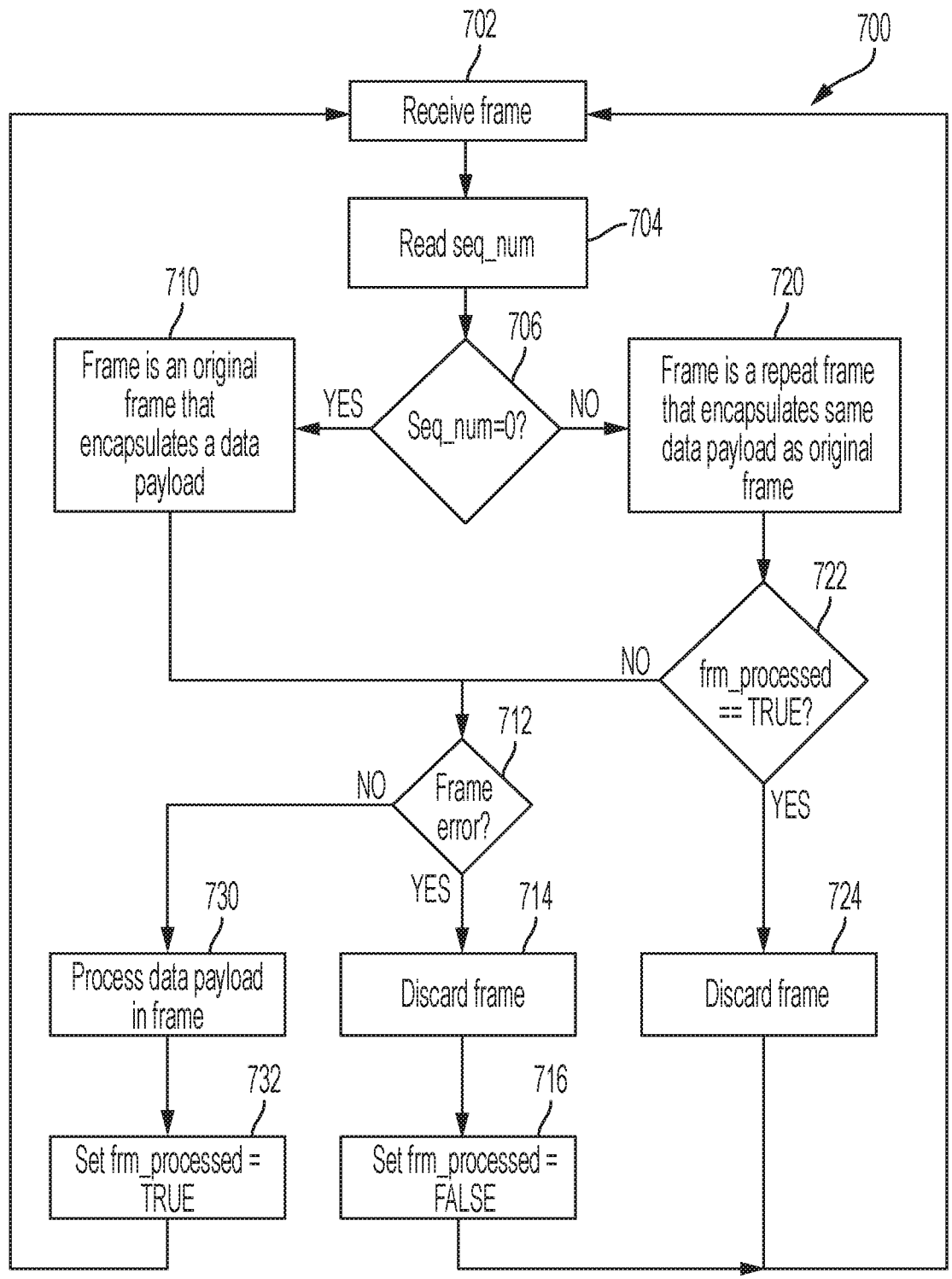
FIG. 7 is a flow diagram that illustrates an example embodiment of a receive process for reliable low latency data communication.

FIG. 7 is a flow diagram that illustrates an example embodiment of a receive process 700 for reliable low latency data communication. As described in greater detail below, the receive process 700 can receive and process original and repeat frames transmitted from a transmit node (e.g., 410-1) according to the transmit process 600 of FIG. 6. In some embodiments, the receive process 700 can be performed by a processor or any fixed logic in a receive node 420-1 (e.g., Mesh Node 200 of FIG. 2).

At block 702, the receive node 420-1 processor receives a frame from the transmit node 410-1 over a data connection. The received frame can be an original frame or a repeat frame. As discussed above in connection with FIG. 6, in some embodiments, the received frame can include a sequence number that is set to an initial bit sequence for an original frame containing a data payload and incremented for each repeat frame that carries the same data payload. In some embodiments, the receive node 420-1 processor can receive a repeat frame at a time when an idle, comma or other administrative control symbol is conventionally transmitted.

At block 704, the receive node 420-1 processor can read the sequence number from the frame. As discussed above in connection with FIGS. 5A-5C, in some embodiments, the sequence number (e.g., 502) can be inserted at any suitable location within the frame (e.g., a frame header or a packet header).

At determination block 706, the receive node 420-1 processor can determine whether the sequence number is an initial sequence number for an original frame. If the sequence number is an initial sequence number (e.g., determination block 706==YES), the receive node 420-1 processor can determine that the frame received at block 702 is an original frame that encapsulates a new data payload and thus continue to determination block 712.

At determination block 712, the receive node 420-1 processor checks the frame for checksum or other frame errors. If there are no frame errors (i.e., determination block 712==NO), the receive node 420-1 processor processes the data payload encapsulated in the original frame, at determination block 730, and sets a "processed" flag or other marker in a memory of the receive node to indicate that the original frame containing the data payload has been processed (e.g., frm_processed=TRUE), at block 732. If frame errors are detected (i.e., determination block 712==YES), the receive node 410-2 processor can discard the original frame, at block 714, and set the "processed" flag to indicate that the original frame containing the data payload has not been processed (e.g., frm_processed=FALSE) at block 716. The process 700 can return to block 702 from block 732 or block 716, respectively, to receive another frame.

if, at determination block 706, the sequence number of the frame is determined to be an incremented sequence number (e.g., determination block 706==NO), the receive node 420-1 processor can determine that the frame received at block 702 is a repeat frame that encapsulates the same data payload as the most recent original frame at block 720 and thus continue to determination block 722.

At determination block 722, the receive node 420-1 processor can check the "processed" flag to determine whether the most recent original frame or any associated repeat frame has been processed. In the event that a previously received frame containing the data payload has been processed (i.e., determination block 722==YES), receive node 420-1 processor can discard the received frame.

Conversely, if no previously received frame containing the data payload has been processed, e.g., due to frame errors (i.e., determination block 722==NO), the receive node 420-1 processor checks the frame for checksum or other frame errors at determination block 712. If there are no frame errors e., determination block 712 NO), the receive node 420-1 processor processes the data payload encapsulated in the repeat frame, at determination block 730, and sets a "processed" flag or other marker in a memory of the receive node to indicate that the repeat frame containing the data payload has been processed (e.g., frm_processed=TRUE), at block 732. If frame errors are detected (i.e., determination block 712==YES), the receive node 410-2 processor can discard the repeat frame, at block 714, and set the "processed" flag to indicate that the original frame containing the data payload has not been processed (e.g., frm_processed=FALSE) at block 716. The process 700 can return to block 702 from block 732 or block 716, respectively, to receive another frame.

Figure 8:
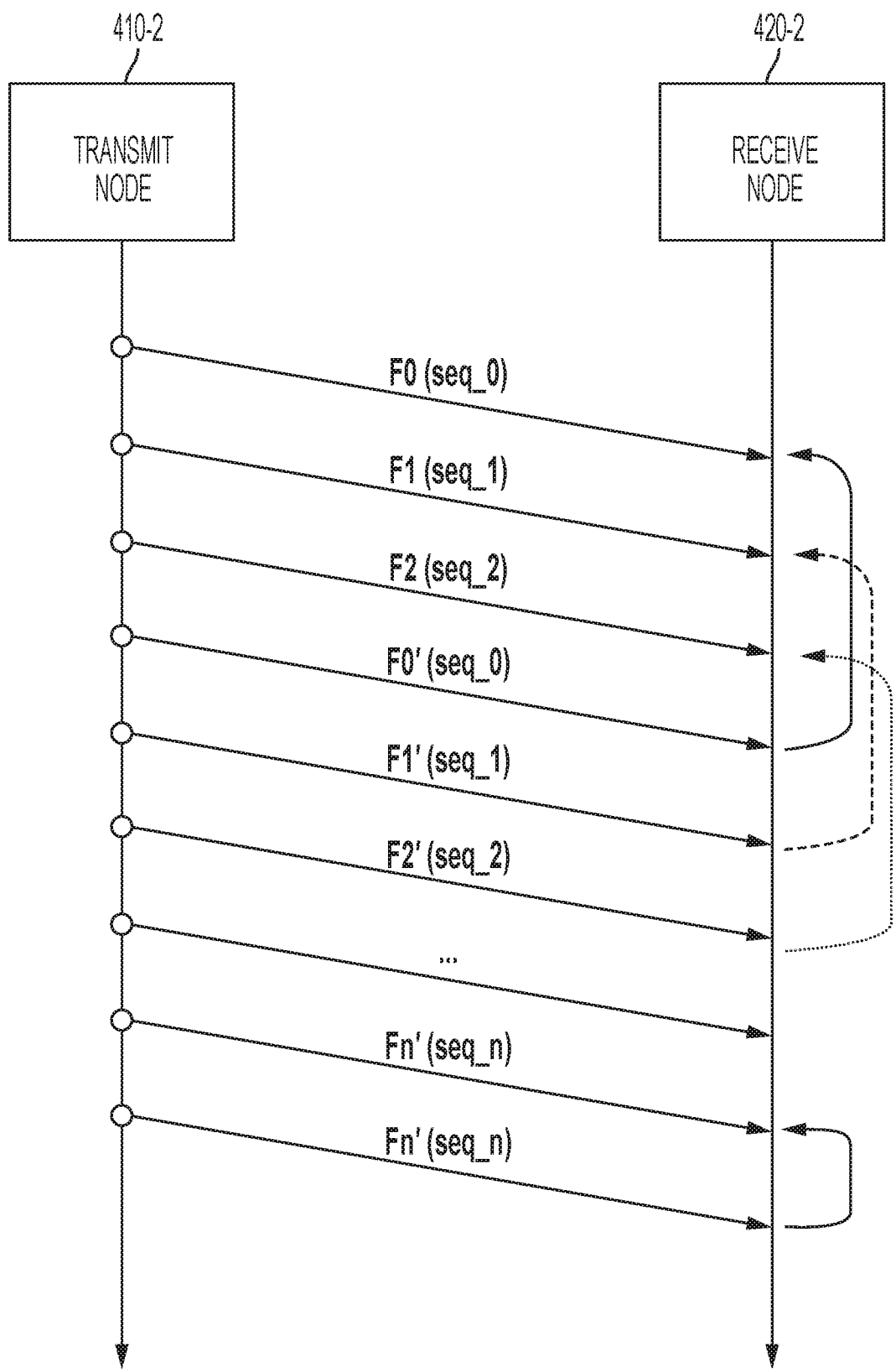
FIG. 8 is a timing diagram that illustrates a method of reliable low latency data communication that involves transmission of repeat frames according to another embodiment.

FIG. 8 is a timing diagram that illustrates a method of reliable low latency data communication that involves transmission of repeat frames according to another embodiment. In the illustrated embodiment, a transmit node 410-2 transmits a data payload in an original data frame to a receive node 420-2 and then repeatedly transmits the data payload in one or more repeat frames that are duplicates of the original data frame. In some embodiments, the repeat frames are transmitted without waiting for any positive or negative acknowledgment (e.g., ACK or NACK) of the original frame from the receive node 420-2.

In this example embodiment, the sequence number included in each repeat frame can be the same as the sequence number included in the original frame. Accordingly, an advantage of this embodiment is that one or more repeat frames can be transmitted in any order (e.g., round robin) after a burst of multiple original frames. Thus, transmission of the repeat frames can be performed without adding any latency to transmission of any original frame containing a new data payload. The receive node can use the sequence number to determine which repeat frames carry the same data payload as any previously received original frame. To the extent that any of the original frames contain errors, the receive node can obtain the missing data payloads in one or more of the repeat frames. Although the example embodiments disclosed herein use sequence numbers as repeat indicators, any unique identifier can be used for identifying an original frame and its repeat frames that carry the same payload.

In some embodiments, one or more idle, comma, or other control signals can be suppressed to transmit the repeat frames. In some embodiments, the transmit node 410-2 can stop sending the repeat frames associated with an original frame when a maximum number of repeat frames is reached or when the source node 410-2 receives a positive acknowledgement of successful receipt of the payload (e.g., ACK) from the receive node 420-2.

For purposes of this example, FIG. 8 illustrates that each original frame F0, F1, F2, . . . , and Fn can include a different sequence number that is incremented for each original frame (e.g., seq_0, seq_1, seq_2, . . . seq_n). To provide reliable communication of the data payloads carried in the original frame set, one or more repeat frames F0', F1', F2', . . . Fn' can be transmitted when the transmit node is not transmitting data (e.g., when the data connection is idle). In particular, the sequence number included in a repeat frame is identical to the sequence number of the original frame that carries the same data payload. For example, the original frame F0 and its repeat frame F0' have the same sequence number seq_0. In this way, the repeat frames F0', F1', F2', . . . Fn' can be transmitted in any order after the original frames have been sent. When frame errors are detected in an original frame, the receive node can discard the original frame and process one of the repeat frames having the same sequence number as the original frame. In some embodiments, one or more idle, comma, or other control signals can be suppressed to transmit the repeat frames.

In some embodiments, the sequence number can be a rotating sequence number that resets to the initial sequence number after a maximum sequence number has been reached. For example, when the maximum sequence number is 8, the transmit node 410-2 can send repeat frames for up to eight previously transmitted original frames (e.g., seq_0 . . . seq_7). When a ninth original frame is ready for transmission, the sequence number can be reset to the initial sequence number (e.g., seq_0) and thus re-used to identify the ninth original frame and its repeat frames within the data stream.

Figure 9:
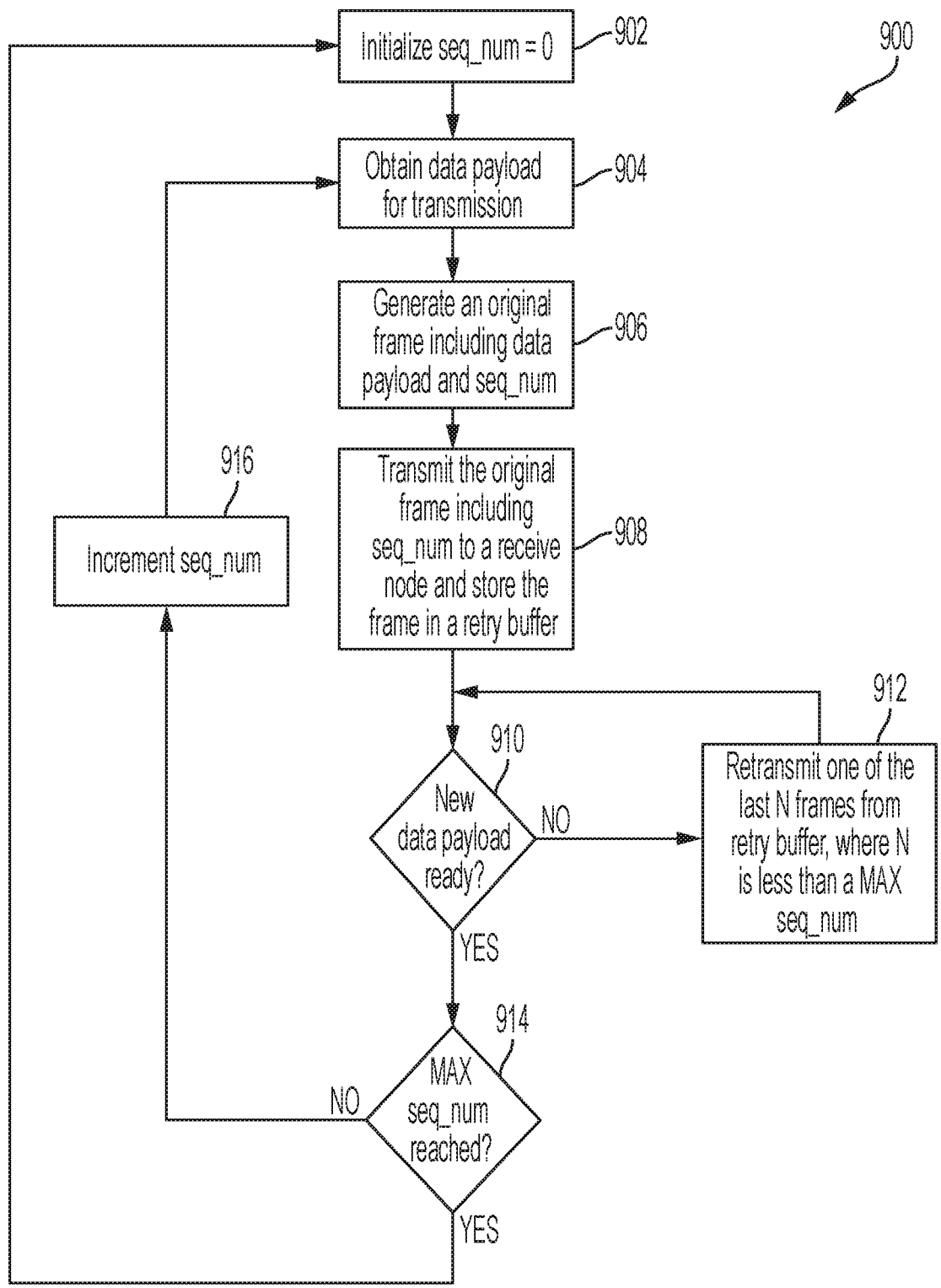
FIG. 9 is a flow diagram that illustrates another example embodiment of a transmit process for reliable low latency data communication.

FIG. 9 is a flow diagram that illustrates another example embodiment of a transmit process 900 for reliable low latency data communication. As discussed above in connection with FIG. 8, the sequence number included in an original frame and each of its repeat frames is the same. When a new data payload is ready for transmission, the sequence number is incremented for the next original frame and its repeat frames containing the new data payload. In some embodiments, the transmit process 900 can be performed by a processor or any fixed logic of a transmit node 410-2 (e.g., Mesh Node 200 of FIG. 2).

At block 902, the transmit node 410-2 processor can set the sequence number to an initial sequence number (e.g., seq_0). As discussed above, sequence numbers can be defined as a single word or bit sequence having a predefined length. In some embodiments, the length of a sequence number can range from a single bit to a byte, or more. In the illustrated embodiment, the bit sequence length can restrict the maximum possible number of original frames for which repeat frames can be transmitted at any particular time. For example, where the sequence number is four bits, repeat frames can be transmitted for at most fifteen (15) of the most recent original frames.

At block 904, the transmit node 410-2 processor obtains a new data payload for transmission to a receive node 420-2. In some embodiments, the new data payload can be any packet formatted according to the specifications of a transport/network protocol (e.g., TCP/IP, UDP/IP, etc.) or other user data.

At block 906, the transmit node 410-2 processor can generate an original frame that encapsulates the new data payload received at block 904. The original frame can also be modified or adapted to include the initial sequence number (e.g., seq_0) provided at block 902. As discussed above in connection with FIGS. 5A and 5B, in some embodiments, the sequence number (e.g., 502) can be inserted at any suitable location within the frame header (e.g., preamble 506 or address portion 510 or 512). In other embodiments, the sequence number (e.g., 502) can be inserted at any suitable location within the data payload itself (e.g. ID 532 of IP packet header 522) as described in connection with FIG. 5C.

At block 908, the transmit node 410-2 processor can transmit the original frame (including the sequence number and data payload) over a data connection to a receive node 420-2. Persons skilled in the art will recognize that a data frame is typically encoded using a symbol encoding scheme (e.g., 8/10*b*, 64/66*b*, etc.) prior to transmission over the data connection. Once the original frame is transmitted, the frame (including its sequence number and data payload) can be stored in a memory of the transmit node 410-2. In some embodiments, a copy of the original frame can be stored in a retry buffer for later retransmission as a repeat frame.

At determination block 910, the transmit node 410-2 processor can check whether a new data payload (e.g., a packet) is ready for transmission. If there is no new data payload ready to send (i.e., determination block 910=NO), the transmit node 410-2 processor can transmit a repeat frame that is a duplicate of any previously transmitted original frame. For example, in some embodiments, the transmit node 410-2 processor can retransmit one of the last N most recent original frames stored in the retry buffer, where N is less than a maximum sequence number. In some embodiments, the transmit node 410-2 processor can repeat the last N most recent original frames in a round robin order. For example, as shown in FIG. 8, repeat frames F0', F1', and F2' are transmitted in the same transmission order of the corresponding original frames F0, F1, and F2.

In some embodiments, transmission of a repeat frame currently in progress can be interrupted as soon as a new data payload (e.g., a packet) is ready for transmission. For example, in some embodiments, the transmit node 410-2 processor can send a Start of Packet (SOP) symbol in the middle of the repeat frame transmission as soon as the new data packet is ready. The receive node 420-2 can interpret the SOP symbol as authorization to discard the partially received repeat frame. In some embodiments, an End of Bad Packet (EBP) symbol (e.g., as used in InfiniBand and PCI-e) or a custom early termination symbol can be transmitted to interrupt and terminate transmission of a repeat frame. In this way, transmission of repeat frames for previous data payloads does not add latency to the transmission of new data payloads. In some embodiments, the transmit node 410-1 processor can transmit at least one repeat frame regardless of whether there is a new data payload ready for transmission, In some embodiments, the transmit node 410-1 processor can be configured to transmit at least one repeat frame regardless of whether there is a new data payload ready for transmission, thereby providing at least one chance to recover the data from a corrupt original frame using the data from a repeat frame. However, when a new data payload is ready for transmission and at least one repeat frame has been sent for the previous data payload, the transmit node 410-1 processor can be configured to interrupt transmission of a repeat frame currently in progress.

Conversely, when a new data payload is determined to be ready for transmission (e.g., determination block 910=YES), the transmit node 410-2 processor can determine whether the maximum sequence number has been reached at determination block 914. In the event that the maximum sequence number has not been reached (i.e., determination block 914=NO), the transmit node 410-2 processor can increment the sequence number to a next incremented sequence number at block 916 and the process returns to blocks 902-912 to transmit a new original frame and one or more repeat frames with the incremented sequence number for identifying the frames containing the new data payload.

Conversely, if the maximum sequence number has been reached (i.e., determination block 914=YES), the transmit node 410-2 processor can repeat block 902-912 to reset the sequence number to an initial sequence number (e.g., seq_0) and transmit new original and repeat frames with the initial sequence number being reused for identifying the frames containing the new data payload. In some embodiments, the sequence number can be reset before the maximum sequence number is reached. Put another way, if the maximum sequence number (e.g., MAX seq_num) is N, the transmit node 410-2 processor can retransmit fewer than the last N most recent original frames, thereby providing some tolerance for sequence number wrapping. For example, if the sequence number has a 4-bit length and thus the maximum sequence number is 15 (i.e., 1111*b*), the transmit node 410-2 processor can repeat fewer than fifteen (15) of the most recently sent original frames (e.g., repeat thirteen (13) of the most recent original frames).

Figure 10:
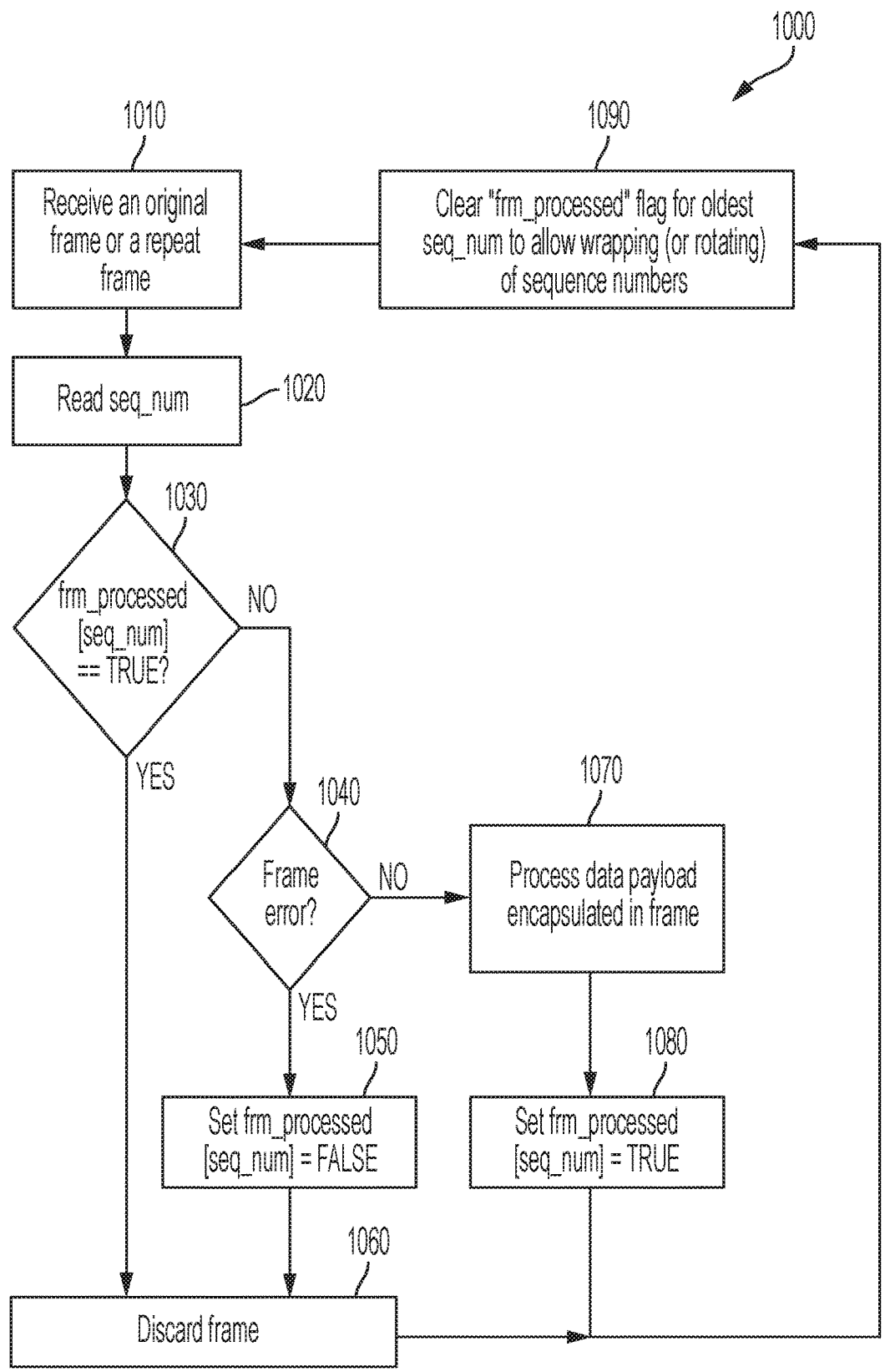
FIG. 10 is a flow diagram that illustrates another example embodiment of a receive process for reliable low latency data communication.

FIG. 10 is a flow diagram that illustrates another example embodiment of a receive process 1000 for reliable low latency data communication. As described in greater detail below, the receive process 1000 can receive and process original and repeat frame transmitted from a transmit node (e.g., 410-2) according to the transmit process 900 of FIG. 9. In some embodiments, the receive process 1000 can be performed by a processor or any fixed logic in a receive node 420-2 (e.g., Mesh Node 200 of FIG. 2).

At block 1010, the receive node 420-2 processor can receive a frame from the transmit node (e.g., 410-2 of FIG. 8) over a data connection. The received frame can be an original frame or a repeat frame. As discussed above in connection with FIG. 9, in some embodiments, the sequence number can be identical for an original frame and each repeat frame containing the same data payload. In some embodiments, each repeat frame can be a duplicate of a corresponding original frame. In some embodiments, the receive node 410-2 processor can receive a repeat frame at a time when an idle, comma or other administrative control symbol is conventionally transmitted.

At block 1020, the receive node 420-2 processor can read the sequence number from the frame. As discussed above in connection with FIGS. 5A-5C, in some embodiments, the sequence number (e.g., 502) can be inserted at any suitable location within the frame (e.g., a frame header or a packet header).

At determination block 1030, the receive node 420-2 processor can determine whether a data payload associated with the sequence number provided in block 1020 has been processed in the original frame or any previously received repeat frame. In some embodiments, the receive node 420-2 processor can access a "processed" flag or other marker in a memory of the receive node that can be indexed by sequence number (e.g., frm_processed [seq_num]). If the "processed" flag indicates that a frame associated with that sequence number has been processed (i.e., determination block 1030=YES), the current frame can be discarded and the receive process 1000 can return to blocks 1090 and 1010 to receive a next frame.

Conversely, if the "processed" flag indicates that there are no previous frames associated with the sequence number that have been processed (i.e., determination block 1030=NO), the receive node 420-2 processor can check the current frame for checksum errors at determination block 1040. If there are no frame errors (i.e., determination block 1040=NO), the receive node 420-2 processor can process the data payload encapsulated in the current frame, at block 1070, and set the "processed" flag to indicate that a frame associated with the sequence number provided at block 1020 has been processed (e.g., frm_processed [seq_num]=TRUE), at block 1080.

Conversely, in the event that frame errors are detected (i.e., determination block 1040=YES), the receive node 420-2 processor can set the "processed" flag in the memory to indicate that no frame associated with the sequence number from the current frame has been processed (e.g., frm_processed [seq_num]=FALSE) at block 1050 and discard the frame at block 1060. The receive process 1000 can return to blocks 1090 and 1010 to receive another frame.

In some embodiments, as discussed above in connection with FIG. 9, the sequence numbers assigned to original frames and repeat frames can be a rotating sequence number that wraps around. For example, a rotating sequence number having a 4-bit length can increment in value from 0000b ('0') to 1111b ('15') and then start over again at 0000b ('0'). Thus, at block 1090, when the end of a rotating sequence number cycle is reached, the receive node 420-2 processor can clear the "processed" flag in the memory for the oldest sequence number of a previously received frame (e.g., frm_processed[oldest_seq_num]=FALSE). This allows the oldest sequence number to be reused for processing a new data frame having the same sequence number. For example, if the current sequence number of a frame received at the receive node 420-2 corresponds to the end of the rotating sequence number cycle (e.g., seq_num_15), the receive node 420-2 processor can reset the "processed" flag for the oldest sequence number (e.g., seq_0). Once reset, the oldest sequence number can be incremented to the next oldest sequence number (e.g., seq_1) and the end of the rotating sequence number cycle can be updated to the beginning of the rotating sequence (e.g., seq_0). In this way, the receive node 420-2 processor can continue resetting the "processed" flag for the oldest sequence number whenever a frame having a sequence number that marks the end of the rotating sequence is received.

In other embodiments, if the transmit node 420-1 processor is configured to repeat a frame 'N' times, the receive node 420-2 processor can reset the "processed" flag for a particular sequence number (e.g., seq_1) after a frame associated with that particular sequence number is repeatedly received N times.

Figure 11A:
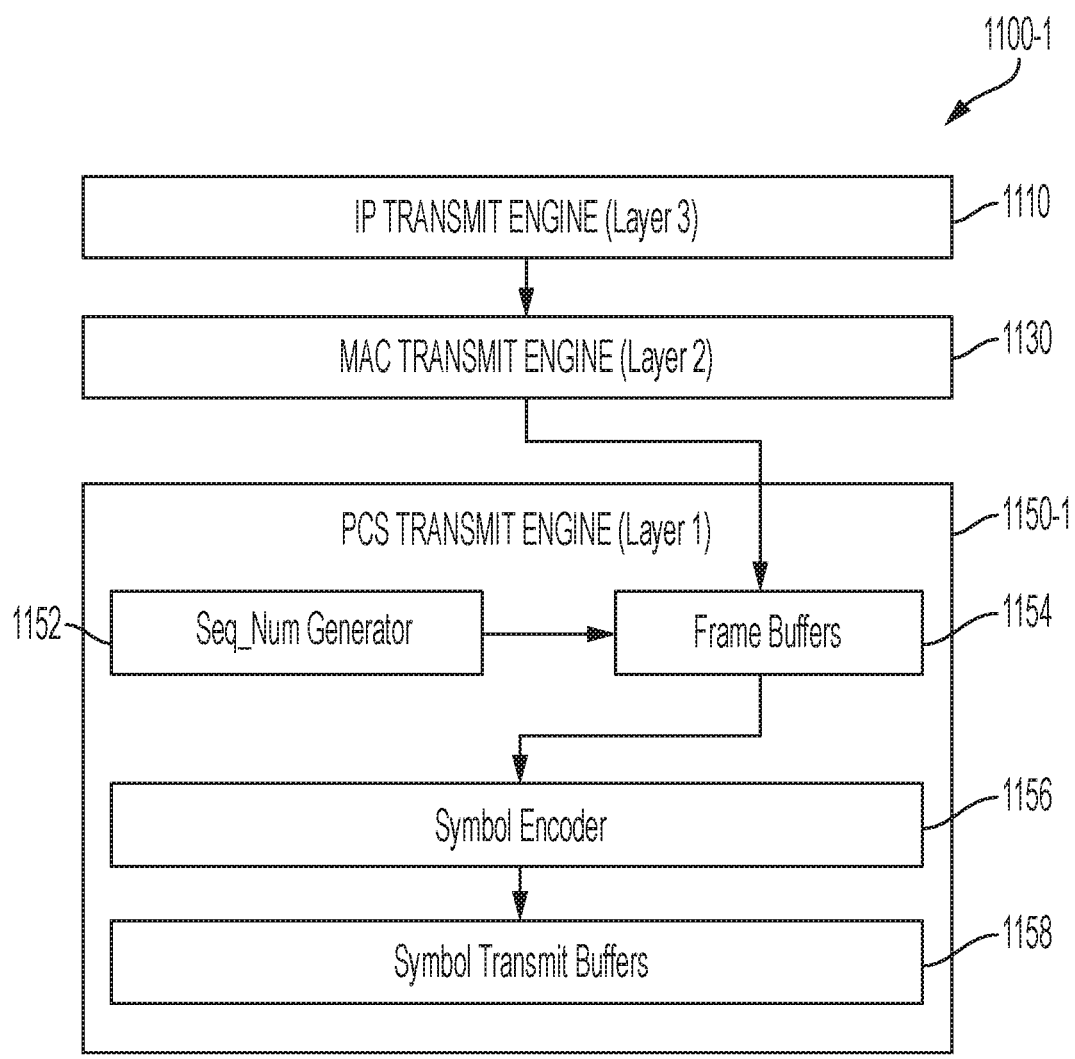
FIGS. 11A, 11B, and 11C illustrate example embodiments of a transmit engine for reliable low latency data communication.
Figure 11B:
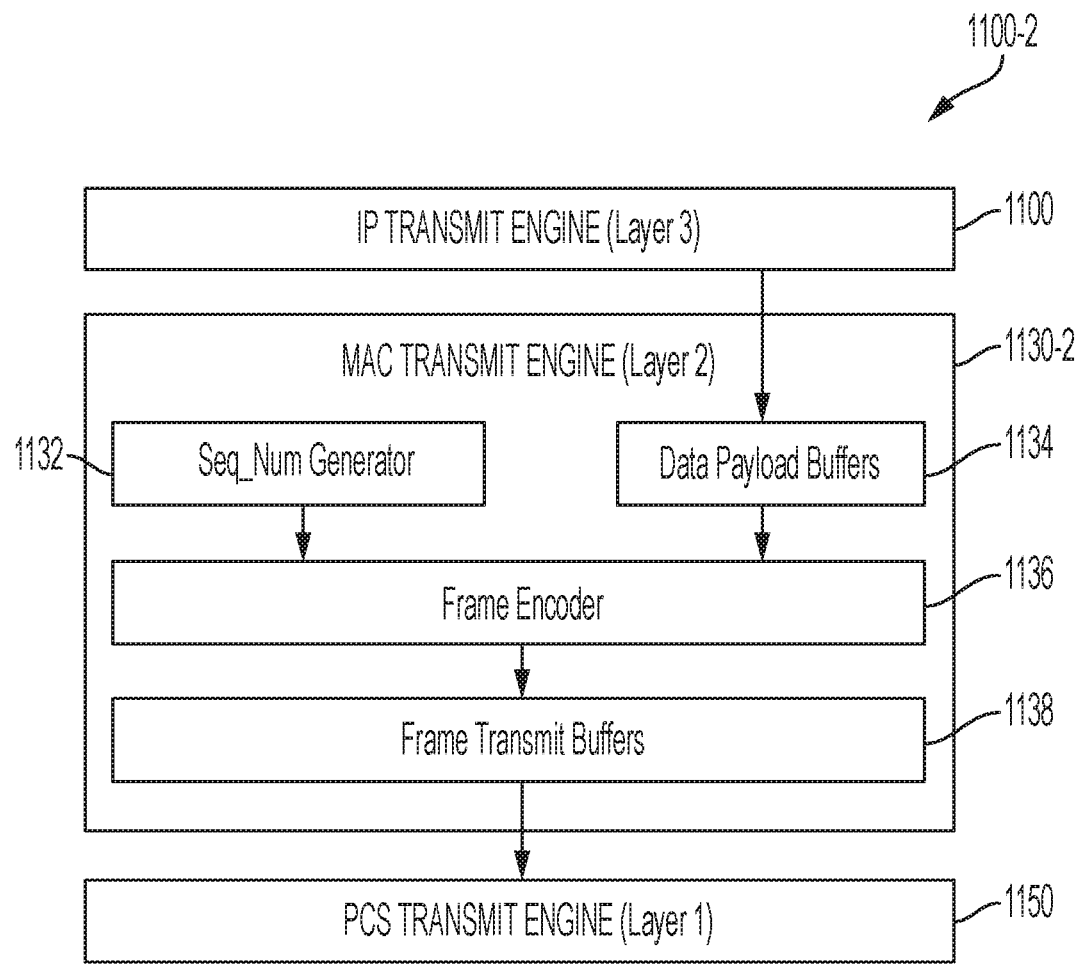
Figure 11C:
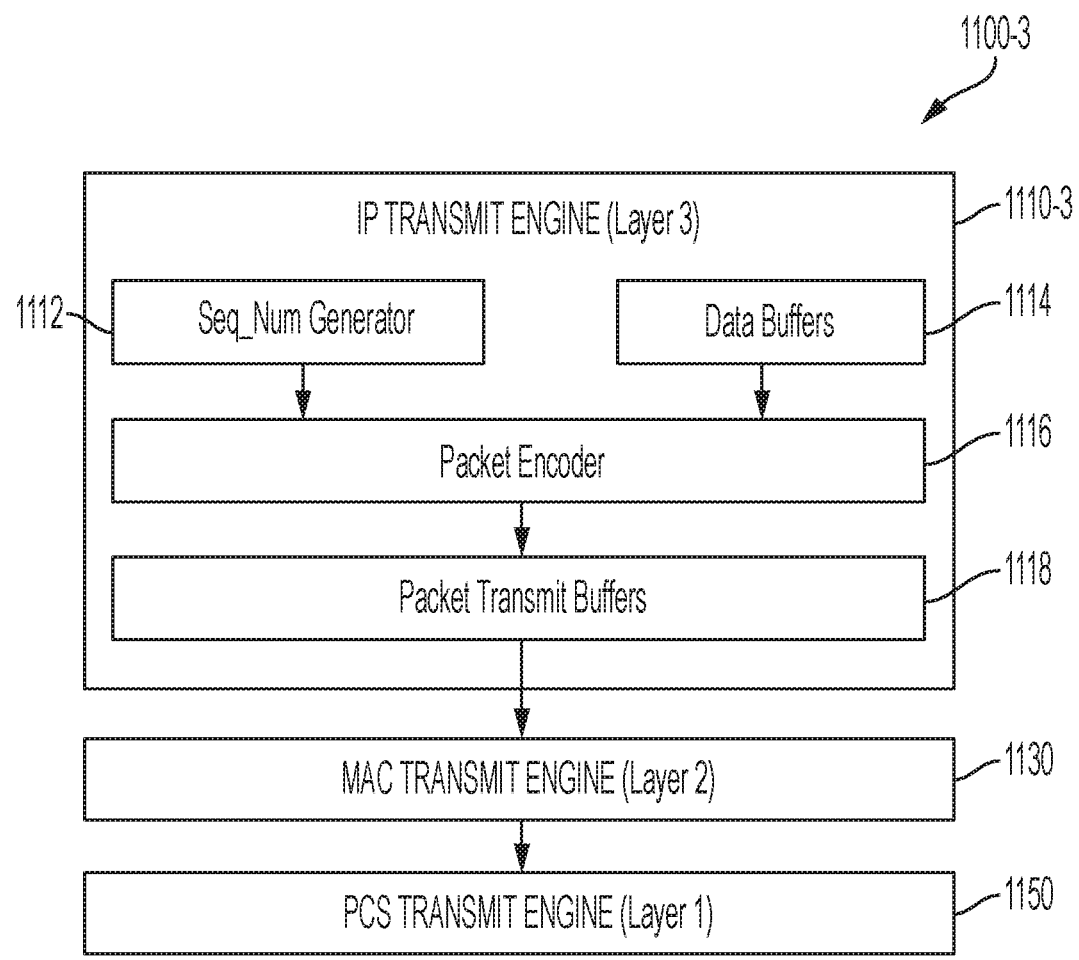

FIGS. 11A-11C illustrate example embodiments of a transmit engine for reliable low latency data communication. Although the illustrated embodiments of the transmit engine are provided for certain types of Ethernet data communication (e.g., 10/25/40/100 GigE), persons skilled in the art will recognize that the disclosures provided herein can be adapted and/or modified for other types of physical layer data communication, including but not limited to InfiniBand, USB, PCI-e, and HDMI.

Referring to FIG. 11A a transmit engine 1100-1 can include, among other components, a standard network layer transmit engine 1110, a standard data link layer transmit engine 1130, and a modified physical layer transmit engine 1150-1. In some embodiments, a processor or other fixed logic of a transmit node (e.g., a mesh node 200 of FIG. 2) can be used to execute the components of the transmit engine 1100-1.

In the illustrated embodiment, the network layer transmit engine 1110 can generate data packets formatted according to specifications of a network layer protocol, such as but not limited to the Internet Protocol (IP) or other data payload. The data link layer transmit engine 1130 and the physical layer transmit engine 1150-1 can respectively include a Media Access Control (MAC) transmit engine and a modified Physical Coding Sublayer (PCS) engine. The IP, Ethernet MAC, and Ethernet PCS protocol specifications, as well as the specifications for other related communication protocols, are well known and readily understood by persons skilled in the art. Accordingly, except as described herein, a detailed discussion of these components is omitted for the purpose of brevity.

In some embodiments, the IP transmit engine 1110 can provide IP data packets to the Ethernet MAC transmit engine 1130 for encapsulation into data frames. The data frames can, in turn, be provided to the modified. PCS transmit engine 1150-1 for encoding prior to transmission over an Ethernet connection. The PCS transmit engine can encode each data frame into a set of 8*b*/10*b* or 64/66*b* frame symbols prior to transmission over the data connection. The PCS transmit engine 1150-1 can also handle transmission of certain control symbols, such as idle and comma symbols when a data connection is idle.

In the illustrated embodiment, the Ethernet PCS transmit engine 1150-1 can include a sequence number generator 1152, frame buffers 1154, a symbol encoder 1156, and symbol transmit buffers 1156. The frame buffers 1154 can temporarily store the original frames provided by the Ethernet MAC transmit engine 1130. When an original frame is received in one of the frame buffers 1154, the sequence number generator 1152 can output a sequence number or other repeat indicator for insertion into the original frame as discussed above in connection with FIG. 6 or 9. In some embodiments, the Ethernet PCS transmit engine 1150-1 can overwrite a preamble portion of the frame header with the sequence number, e.g., as described above in connection with FIG. 5A. An advantage of inserting the sequence number into the preamble of the frame header is that the frame checksum (e.g., 506 of FIG. 5A) does not need to be recalculated after being generated by the Ethernet MAC transmit engine 1130. After insertion of the sequence number, the original frame can be symbol-encoded and transmitted over the Ethernet connection via the symbol encoder 1156 and symbol transmit buffers 1156.

After transmitting the original frame, the Ethernet PCS transmit engine 1150-1 can be configured to transmit one or more repeat frames containing the same data payload as discussed above in connection with FIG. 6 or FIG. 9, In some embodiments, where the sequence number generator 1152 increments the sequence number for each repeat frame, the Ethernet PCS transmit engine 1150-1 can generate a repeat frame including the incremented sequence number using the most recent original frame or repeat frame that can be provided in a repeat buffer among the set of frame buffers 1154. Once generated, the repeat frame can proceed to the symbol encoder 1156 and the symbol transmit buffers 1168 for transmission to a receive node. Alternatively, in some embodiments, where the repeat frame is a duplicate of an original frame, the Ethernet PCS transmit engine 1150-1 can resend a symbol-encoded copy of the original frame that can be provided in a repeat buffer among the set of symbol transmit buffers 1158.

FIG. 11B illustrates various example components of a transmit engine 1100-2 for reliable Ethernet data communication according to another embodiment. As shown, the transmit engine 1100-2 can include, among other components, a network layer transmit engine 1110, a modified data link layer transmit engine 1130-2, and a physical layer transmit engine 1150. In some embodiments, a processor or other fixed logic of a transmit node (e.g., a mesh node 200 of FIG. 2) can be used to execute the components of the transmit engine 1100-2.

In the illustrated embodiment, the network layer transmit engine 1110 can generate data packets formatted according to specifications of a network layer protocol, such as but not limited to the Internet Protocol (IP) or other data payload. The data link layer transmit engine 1130-2 and the physical layer transmit engine 1150 can respectively include a modified Media Access Control (MAC) transmit engine and a Physical Coding Sublayer (PCS) engine. The IP, Ethernet MAC, and Ethernet PCS protocol specifications, as well as the specifications for other related communication protocols, are well known and readily understood by persons skilled in the art. Accordingly, except as described herein, a detailed discussion of these components is omitted for the purpose of brevity.

In some embodiments, the IP transmit engine 1110 can provide IP data packets or other data payload to the modified Ethernet MAC transmit engine 1130-2. The modified Ethernet MAC transmit engine 1130-2 can encapsulate the data payload into original frames, and in some embodiments repeat frames. As discussed above in connection with FIGS. 5A and 5B, each frame can include a sequence number or other repeat indicator in a frame header for identifying the data packet contained in its payload. The frames can, in turn, be provided to the PCS transmit engine 1150 for encoding prior to transmission over an Ethernet connection. As known to persons skilled in the art, the PCS transmit engine 1150 can encode each data frame into a set of 8b/10b or 64/66b frame symbols prior to transmission. The PCS transmit engine 1150 can also handle transmission of certain control symbols, such as idle and comma symbols when a data connection is idle.

In the illustrated embodiment, the modified Ethernet MAC transmit engine 1130-2 can include a sequence number generator 1132, data payload buffers 1134, a frame encoder 1136, and frame transmit buffers 1138. The payload buffers 1134 can temporarily store the data payload provided by the IP transmit engine 1110. When a new data payload is received in one of the payload buffers 1134, the sequence number generator 1132 can output a new sequence number to the frame encoder 1136. The sequence number can be generated as discussed above in connection with FIG. 6 or FIG. 9, In some embodiments, the Ethernet frame encoder 1136 can overwrite at least a portion of a node address (e.g., source and/or destination MAC address) to include the sequence number, e.g., as described above in connection with FIG. 5B. Once generated, the original frame containing the new payload can provided to the Ethernet PCS transmit engine 1150 to be symbol-encoded and transmitted over the Ethernet connection.

After transmission of the original frame, one or more repeat frames containing the same data payload can be transmitted as discussed above in connection with FIG. 6 or FIG. 9. In some embodiments, where the sequence number generator 1132 increments the sequence number for each repeat frame, the Ethernet MAC transmit engine 1130-2 can generate a repeat frame including the incremented sequence number using the most recent original frame (or a last repeat frame) that can be provided in a repeat buffer among the set of frame transmit buffers 1138. Once generated, the repeat frame can be provided to the Ethernet PCS transmit engine 1150 for symbol encoding and transmission over the Ethernet connection. Alternatively, in some embodiments, where the repeat frame is a duplicate of an original frame, the Ethernet PCS transmit engine 1150 can resend a symbol-encoded copy of the original frame that can be provided in a repeat buffer among the set of symbol transmit buffers (e.g., 1158 of FIG. 11A).

FIG. 11C illustrates various example components of a transmit engine 1100-3 for reliable Ethernet data communication according to another embodiment. As shown, the transmit engine 1100-3 can include, among other components, a modified Internet Protocol (IP) transmit engine 1110-3, an Ethernet MAC transmit engine 1130, and a Ethernet PCS transmit engine 1150. The IP, Ethernet MAC, and Ethernet PCS protocol specifications, as well as the specifications for other related communication protocols, are well known and readily understood by persons skilled in the art. Accordingly, except as provided for herein, a detailed discussion of these components is omitted for the purpose of brevity. In some embodiments, a processor or other fixed logic of a transmit node (e.g., a mesh node 200 of FIG. 2) can be used to execute the components of the transmit engine 1100-3.

In the illustrated embodiment, the modified Internet Protocol (IP) transmit engine 1110-3 can include a sequence number generator 1112, data buffers 1114, a packet encoder 1116, and packet transmit buffers 1118. The data buffers 1114 can temporarily store the data formatted according to the specifications of a transport protocol layer (e.g., TCP, UDP, etc.). When new formatted data is received in one of the data buffers 1114, the sequence number generator 1132 can output a sequence number or other repeat indicator to the packet encoder 1136. The sequence number can be generated as discussed above in connection with FIG. 6 or FIG. 9. In some embodiments, the IP packet encoder 1136 can generate an IP packet or other IP payload that encapsulates the formatted data from the data buffers 1114. As described above in connection with FIG. 5C, the sequence number can be inserted in any suitable location within the IP header of the packet, such as but not limited to the identification field of the header (IP_ID) described above in connection with FIG. 5C. Once generated, the new IP data packet can be provided to the Ethernet MAC transmit engine 1130 and the Ethernet PCS transmit engine 1150 for encapsulating and transmitting the new data packet in an original frame over the Ethernet connection.

After transmission of the original frame, one or more repeat frames containing the same data payload can be transmitted as discussed above in connection with FIG. 6 or FIG. 9. In some embodiments, where the sequence number generator 1112 increments the sequence number for each repeat frame, the IP transmit engine 1112 can generate a duplicate payload and include the incremented sequence number in the IP header of the duplicate payload as discussed above. Once generated, the duplicate IP payload can be provided to the Ethernet MAC transmit engine 1130 and the Ethernet PCS transmit engine 1150 for encapsulating and transmitting the new data payload in an original frame over the Ethernet connection.

Alternatively, in some embodiments, where the repeat frame is a duplicate of an original frame, the Ethernet PCS transmit engine 1150-2 can resend a symbol-encoded copy of the original frame that can be provided in a repeat buffer among the set of symbol transmit buffers (e.g., 1158 of FIG. 11A).

Figure 12:
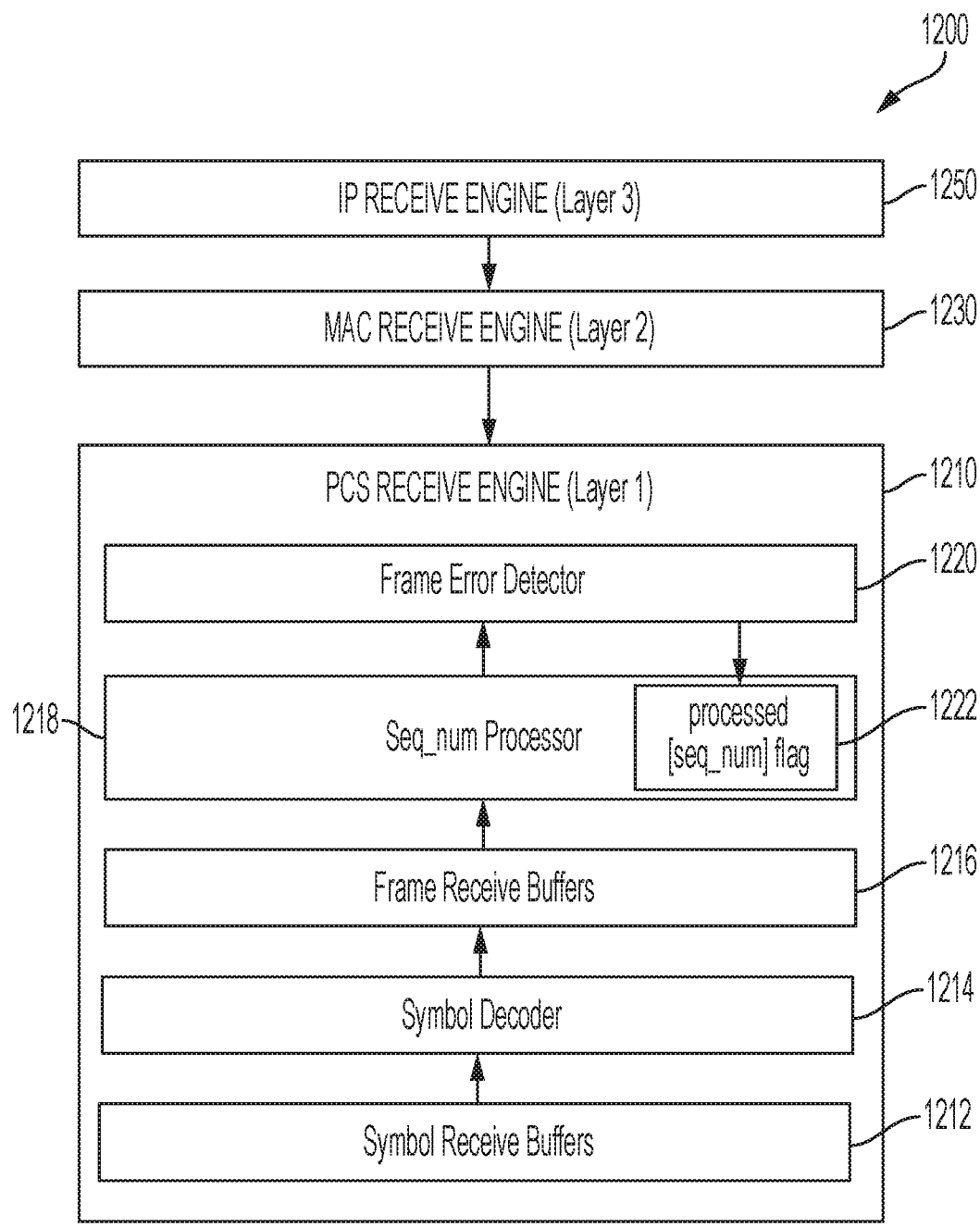
FIG. 12 illustrates various example components of a receive engine for reliable low latency data communication according to an embodiment.

FIG. 12 illustrates various example components of a receive engine 1200 for reliable low latency data communication according to an embodiment. Although the illustrated embodiment of the receive engine is provided for certain types of Ethernet data communication (e.g., 10/25/40/100 GigE), persons skilled in the art will recognize that the disclosures provided herein can be adapted and/or modified for other types of physical layer data communication, including but not limited to InfiniBand, USB, PCi-E, and HDMI.

As shown, the receive engine 1200 can include, among other components, a modified Ethernet PCS receive engine 1210, an Ethernet MAC receive engine 1230, and a network layer receive engine 1250. In some embodiments, the network layer receive engine 1250 can be configured to receive and process data packets formatted according to the Internet Protocol (IP). The IP, Ethernet MAC, and Ethernet PCS protocol specifications, as well as the specifications for other related communication protocols, are well known and readily understood by persons skilled in the art. Accordingly, except as described herein, a detailed discussion of these components is omitted for the purpose of brevity. In some embodiments, a processor or other fixed logic of a receive node (e.g., a mesh node 200 of FIG. 2) can be used to execute the components of the receive engine 1200.

In some embodiments, the modified Ethernet PCS receive engine 1210 can include a symbol receive buffers 1212, a symbol decoder 1214, frame receive buffers 1216, a sequence number processor 1218, and a frame error detector 1220. In some embodiments, the symbol receive buffers 1212 can temporarily store symbol-encoded frames received over an Ethernet connection. A symbol decoder 1214 converts the symbol-encoded frames into decoded frames and provides the decoded frames to the frame receive buffers 1216 for temporary storage.

In some embodiments, the sequence number processor 1218 can be configured to read a sequence number or other repeat indicator from a predetermined location within the frame (e.g., a frame header or a packet header as described in connection with FIGS. 5A-5C). Further, as described in the example embodiments of FIGS. 7 and 10, the sequence number processor 1218 can be configured according to use the sequence number to determine whether the data payload in the current frame has been processed in another previously received frame (e.g., an original or repeat frame). For example, in some embodiments, the sequence number processor 1218 can access a "processed" flag 1222 that can be indexed by a sequence number for this purpose (e.g., frm_processed [seq_num]).

For example, if a data payload in the current frame has not been processed (e.g., frm_processed [seq_num]=FALSE), the sequence number processor 1218 can cause the frame in the receive buffers 1216 to be pushed or pulled to the frame error detector 1220 for error checking. If frame checksum errors are detected, the frame error detector 1220 can discard the frame and attempt to recover the data in a repeat frame that contains the same data payload. Conversely, if no frame checksum errors are detected, the frame error detector 1220 can provide the receive frame to the Ethernet MAC receive engine 1230 and the network layer (e.g., IP) receive engine 1250 for additional frame/payload processing.

In some embodiments, the sequence number processor 1218 can send a positive acknowledgment (e.g., ACK) upon successful receipt of the packet or, conversely, a negative acknowledgement (e.g., NACK) when the packet is not received. In some embodiment, Forward Error Correction (FEC) can still be used as a backup for exceptional circumstances.

In some embodiments, the transmit node 410-1 and the receive node 420-1 can be any of the gateways 120, the compute nodes 140, and the sequencers 150 of the embodiment electronic trading system 100 of FIG. 1. For example, the transmit node can have a processor or other fixed logic that executes a transmit engine for encapsulating a market order in an original frame, transmitting the original frame from the transmit node over a network, and further transmitting one or more repeat frames that encapsulate the same market order as the original frame without waiting for an acknowledgement of the original frame from the receive node. As described above in the example embodiments of FIGS. 4-12, the original frame and at least one of the repeat frames can include a repeat indicator for identifying the at least one of the repeat frames as encapsulating the same market order as the original frame. The receive node 420-1 can have a processor that executes a receive engine for receiving the original frame that encapsulates the market order, discard the original frame in response to detecting an error in the original frame, identify a repeat frame that encapsulates the same market order as the original frame from among the one or more repeat frames received at the receive node, and extract the market order from the identified repeat frame. As described above in the example embodiments of FIGS. 4-12, the repeat frame can be identified based on the repeat indicator of the repeat frame.

Further Implementation Options

It should be understood that the example embodiments described above may be implemented in many different ways. In some instances, the various "data processors" may each be implemented by a physical or virtual general-purpose computer having a central processor, memory, disk or other mass storage, communication interface(s), input/output (I/O) device(s), and other peripherals. The general-purpose computer is used to implement the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically I/O device interfaces for connecting various input and output devices. Network interface(s) allow connections to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, custom designed semiconductor logic, Application Specific Integrated Circuits (ASICs), Field Programmable Gate Arrays (FPGAs), firmware, software, or any combination thereof.

In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include one or more read only memories (ROMs); random access memor(ies) (RAMs); storage including magnetic disk storage media; optical storage media; flash memory devices; and others.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

Therefore, while this invention has been particularly shown and described with references to example embodiments thereof, it will be understood by those skilled in the art that various changes in form and details may be made therein without departing from the scope of the invention as encompassed by the appended claims.

The invention claimed is:

1. A method of data communication, comprising:
transmitting an original frame that encapsulates a data payload from a transmit node to a receive node; and
transmitting one or more repeat frames that encapsulate the same data payload as the original frame from the transmit node without waiting for an acknowledgement of the original frame from the receive node,
wherein the original frame and at least one of the repeat frames include a repeat indicator for identifying the at least one of the repeat frames as encapsulating the same data payload as the original frame.

2. The method of claim 1, further comprising:
receiving the original frame that encapsulates the data payload at the receive node; discarding the original frame;
identifying a repeat frame that encapsulates the same data payload as the original frame from among the one or more repeat frames received at the receive node, wherein the repeat frame is identified based on the repeat indicator of the repeat frame; and
extracting the data payload from the identified repeat frame.

3. The method of claim 1, wherein transmitting the one or more repeat frames comprises suppressing transmission of an idle pattern.

4. The method of claim 1, wherein the repeat indicator is included in a frame header of the original frame and the at least one of the repeat frames.

5. The method of claim 4, wherein the repeat indicator replaces at least a portion of a preamble in the frame header.

6. The method of claim 4, wherein the repeat indicator replaces a least significant bit (LSB) portion of a node address in the frame header.

7. The method of claim 1, wherein the data payload is an Internet Protocol (IP) data packet and the repeat indicator is included in an Internet Protocol Identification (IP_ID) field of the IP data packet.

8. The method of claim 1, wherein the repeat indicator is a sequence number.

9. The method of claim 8, wherein the sequence number is identical for the original frame and the at least one of the repeat frames that encapsulate the same data payload.

10. The method of claim 9, further comprising:
incrementing the sequence number for a new data payload;
transmitting the new data payload in another original frame and one or more repeat frames associated with the another original frame, each including the same sequence number incremented for the new data payload.

11. The method of claim 8, wherein the sequence number is incremented for each repeat frame that encapsulates the same data payload as the original frame.

12. The method of claim 11, further comprising:
setting the sequence number to an initial sequence number for the original frame;
incrementing the sequence number for each repeat frame that encapsulates the same data payload as the original frame; and
resetting the sequence number to the initial sequence number for another original frame that encapsulates a new data payload.

13. The method of claim 1, further comprising:
interrupting transmission of any of the one or more repeat frames to transmit another original frame that encapsulates a new data payload.

14. The method of claim 1, wherein the data payload is an Internet Protocol (IP) data packet.

15. The method of claim 1, wherein each of the original frame and the one or more repeat frames is an Ethernet frame, an InfiniBand frame, a USB frame, a PCI-e frame, or an HDMI frame.

16. A data communication system, comprising:
a transmit node having a processor that executes a transmit engine;
the transmit engine being executed to encapsulate a data payload in an original frame, transmit the original frame from the transmit node over a data connection, and further transmit one or more repeat frames that encapsulate the same data payload as the original frame,
wherein the original frame and at least one of the repeat frames include a repeat indicator for identifying the at least one of the repeat frames as encapsulating the same data payload as the original frame.

17. The data communication system of claim 16, wherein the transmit engine of the transmit node includes a media access control (MAC) component and a physical code sublayer (PCS) component.

18. The data communication system of claim 16, further comprising:
a receive node having a processor that executes a receive engine;
the receive engine being executed to receive the original frame that encapsulates the data payload, discard the original frame, identify a repeat frame that encapsulates the same data payload as the original frame from among the one or more repeat frames received at the receive node, and extract the data payload from the identified repeat frame,
wherein the repeat frame is identified based on the repeat indicator of the repeat frame.

19. The data communication system of claim 18, wherein the receive engine of the receive node includes a physical code sublayer (PCS) component and a media access control (MAC) component.

20. The data communication system of claim 16, wherein the transmit engine of the transmit node suppresses transmission of an idle pattern to transmit the one or more repeat frames.

21. The data communication system of claim 16, wherein the repeat indicator is included in a frame header of the original frame and the at least one of the repeat frames.

22. The data communication system of claim 21, wherein the repeat indicator replaces at least a portion of a preamble in the frame header.

23. The data communication system of claim 21, wherein the repeat indicator replaces a least significant bit (LSB) portion of a node address in the frame header.

24. The data communication system of claim 16, wherein the repeat indicator replaces at least a portion of a node address in the frame header.

25. The data communication system of claim 16, wherein the data payload is an Internet Protocol (IP) data packet and the repeat indicator is included in an Internet Protocol Identification (IP_ID) field of the IP data packet.

26. The data communication system of claim 16, wherein the repeat indicator is a sequence number.

27. The data communication system of claim 26, wherein the sequence number is identical for the original frame and the at least one of the repeat frames that encapsulate the same data payload.

28. The data communication system of claim 27, wherein the sequence number is incremented to transmit a new data payload in another original frame and one or more repeat frames associated with the another original frame.

29. The data communication system of claim 26, wherein the sequence number is set to an initial sequence number for the original frame, and wherein the sequence number is incremented for each repeat frame that encapsulates the same data payload as the original frame.

30. The data communication system of claim 29, wherein the sequence number is reset to the initial sequence number to transmit a new data payload in another original frame.

31. The data communication system of claim 16, wherein the transmit engine interrupts transmission of any of the one or more repeat frames to transmit another original frame that encapsulates a new data payload.

32. The data communication system of claim 16, wherein the data payload is an Internet Protocol (IP) data packet.

33. The data communication system of claim 16, wherein each of the original frame and the one or more repeat frames is an Ethernet frame, an InfiniBand frame, a USB frame, a PCI-e frame, or an HDMI frame.

34. The method of claim 1, wherein the original frame and the one or more repeat frames are transmitted over a data connection having an average bandwidth utilization equal to 10% or less.

35. The data communication system of claim 16, wherein the transmit engine transmits the original frame and the one or more repeat frames over a data connection having an average bandwidth utilization equal to 1% or less.

36. An electronic trading system, comprising:
a transmit node having a processor that executes a transmit engine;
the transmit engine being executed to encapsulate a market order in an original frame, transmit the original frame from the transmit node over a network, and further transmit one or more repeat frames that encapsulate the same market order as the original frame without waiting for an acknowledgement of the original frame from the receive node,
wherein the original frame and at least one of the repeat frames include a repeat indicator for identifying the at least one of the repeat frames as encapsulating the same market order as the original frame.

37. The electronic trading system of claim 36, further comprising:
a receive node having a processor that executes a receive engine;
the receive engine being executed to receive the original frame that encapsulates the market order, discard the original frame in response to detecting an error in the original frame, identify a repeat frame that encapsulates the same market order as the original frame from among the one or more repeat frames received at the receive node, and extract the market order from the identified repeat frame,
wherein the repeat frame is identified based on the repeat indicator of the repeat frame.

* * * * *